United States Patent
Hiramatsu et al.

(10) Patent No.: US 8,483,279 B2
(45) Date of Patent: Jul. 9, 2013

(54) MOVING IMAGE PARALLEL PROCESSOR HAVING DEBLOCKING FILTERS

(75) Inventors: Yoshitaka Hiramatsu, Sagamihara (JP);
Hiroaki Nakata, Yokohama (JP);
Masakazu Ehama, Sagamihara (JP);
Seiji Mochizuki, Kodaira (JP);
Takafumi Yuasa, Musashino (JP);
Kenichi Iwata, Kokubunji (JP)

(73) Assignee: Renesas Electronics Corporation, Kanagawa (JP)

( * ) Notice: Subject to any disclaimer, the term of this patent is extended or adjusted under 35 U.S.C. 154(b) by 183 days.

(21) Appl. No.: 12/819,394

(22) Filed: Jun. 21, 2010

(65) Prior Publication Data

US 2011/0013696 A1 Jan. 20, 2011

(30) Foreign Application Priority Data

Jul. 16, 2009 (JP) .................. 2009-167518

(51) Int. Cl.
*H04N 7/12* (2006.01)

(52) U.S. Cl.
USPC .................................... 375/240.16

(58) Field of Classification Search
USPC .................................... 375/240.16
See application file for complete search history.

(56) References Cited

U.S. PATENT DOCUMENTS

| | | | |
|---|---|---|---|
| 2006/0133504 A1* | 6/2006 | Jung et al. | 375/240.16 |
| 2008/0031329 A1* | 2/2008 | Iwata et al. | 375/240.12 |

FOREIGN PATENT DOCUMENTS

| | | |
|---|---|---|
| JP | 2001-186524 A | 7/2001 |
| JP | 2006-174486 A | 6/2006 |
| JP | 2007-258882 A | 10/2007 |
| JP | 2008-42571 A | 2/2008 |

OTHER PUBLICATIONS

T. Wiegand et al., Draft ITU-T Recommendation and Final Draft International Standard of Joint Video Specification (ITU-T Rec. H.264|ISO/IEC 14495-10 AVC, Mar. 2003. http://www.h2631.com/h264/JVC-G050pdf#search='Thomas WiegandJVTGO50d35.doc' (retrieved on Jun. 1, 2009).

ITU-T Recommendation H.263, Video coding for low bit rate communication, Series H: Audiovisual and Multimedia Systems, Infrastructure of Audiovisual Services—Coding of Moving Video and International Telecommunication Union—Telecommunication Standard Sector, Feb. 1998, http://www.itu.int/rec/T-REC-H.263-199802=S/en, (retrieved on Jun. 20, 2009).

(Continued)

*Primary Examiner* — Richard Torrente
(74) *Attorney, Agent, or Firm* — Mattingly & Malur, PC

(57) ABSTRACT

A moving image processor includes a first and a second moving image processing unit which are able to perform parallel operation, and a data transfer unit having a first buffer and a second buffer. The first moving image processing unit processes macroblocks MB00, - - - , of one row of one image sequentially, and the second moving image processing unit processes macroblocks MB10, - - - , of the next row sequentially. The first and the second moving image processors include a first and a second deblocking filters, respectively. Operation timing of the second filter is delayed by the processing time of two macroblocks, compared with operation timing of the first filter. The processing results of the first filter and the second filter are transferred to an external memory via the first buffer and the second buffer of the transfer unit.

5 Claims, 15 Drawing Sheets

OTHER PUBLICATIONS

SMPTE Draft Standard for Television SMPTE 421M, Proposed SMPTE Standard for Television: VC-1 Compressed Video Bitstream Format and Decoding Process, Aug. 23, 2005, http://multimedia.cx/mirror/s421m.pdf#seacrh='SMPTE 421M draft Standard for VX1', (retrieved on Jun. 30, 2009).

Japanese Office Action received in Japanese Application No. 2009-167518 issued Jan. 17, 2013.

* cited by examiner

Fig.3

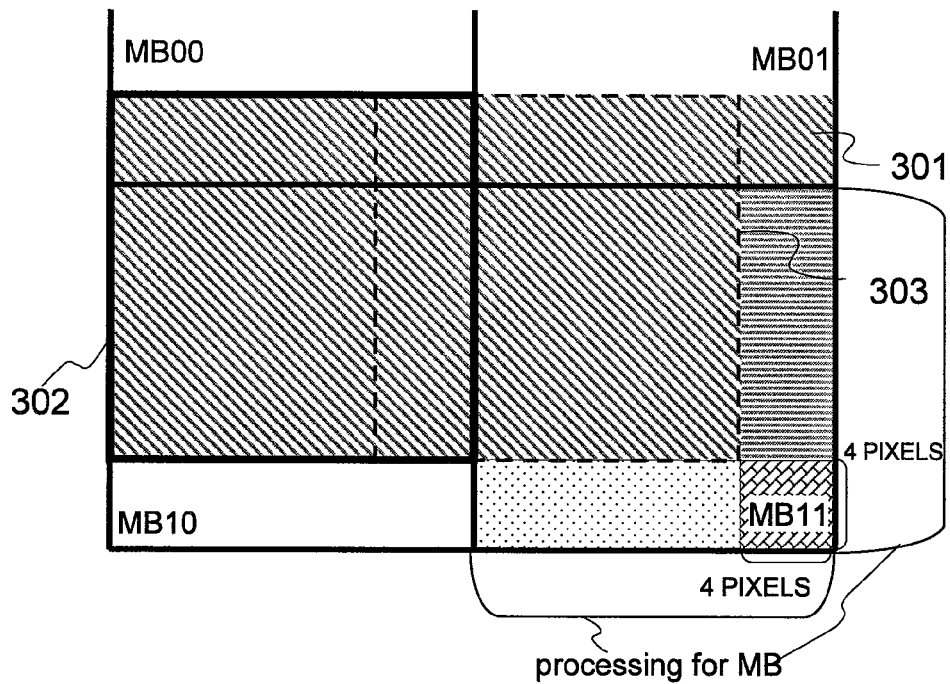

 MACROBLOCK BOUNDARY

 AREA WHERE FILTERING COMPLETED

 AREA WHERE FILTERING IS PERFORMED TO HORIZONTAL BOUNDARY IN LOWER MACROBLOCK

 AREA WHERE FILTERING IS PERFORMED TO VERTICAL BOUNDARY IN RIGHT-HAND SIDE MACROBLOCK

 AREA WHERE FILTERING IS PERFORMED TO VERTICAL BOUNDARY IN RIGHT-HAND SIDE MACROBLOCK AND FILTERING IS PERFORMED TO HORIZONTAL BOUNDARY IN LOWER MACROBLOCK

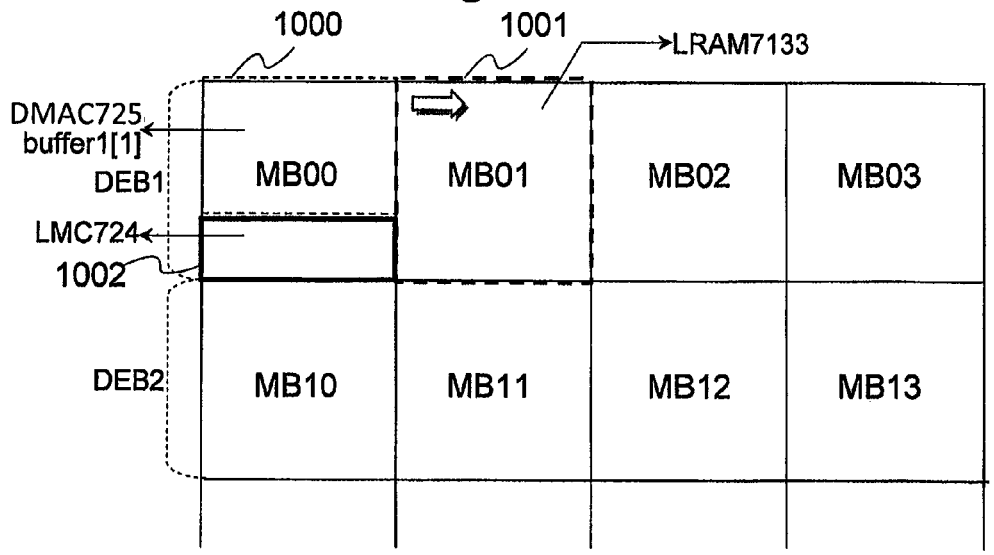
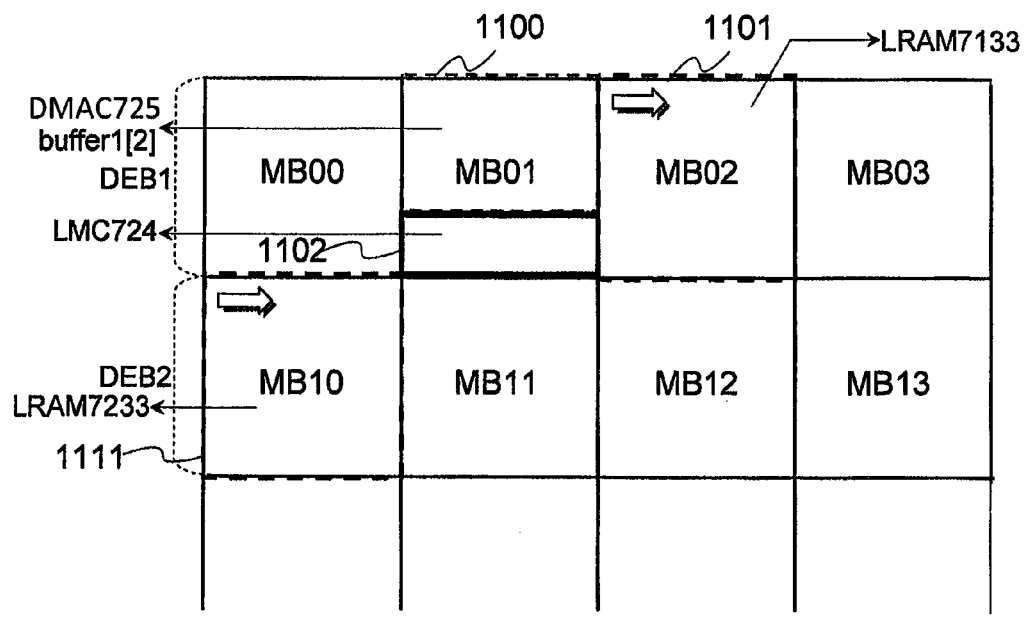

MOVING IMAGE PARALLEL PROCESSOR HAVING DEBLOCKING FILTERS

CLAIM OF PRIORITY

The present application claims priority from Japanese patent application JP 2009-167518 filed on Jul. 16, 2009, the content of which is hereby incorporated by reference into this application.

FIELD OF THE INVENTION

The present invention relates to a moving image processor and a processing method for the same, especially to technology which is effective in facilitating a transfer of plural processing results to an external memory, in performing parallel deblocking filtering of plural macroblocks.

BACKGROUND OF THE INVENTION

As a moving image coding system, there are H.263 standardized by ITU-T (the International Telecommunication Union, the Telecommunication Standardization Sector), MPEG-2 and MPEG-4 standardized by MPEG (the Moving Picture Experts Group) of ISO (the International Organization for Standardization)/IEC (the International Electrotechnical Commission) JTC1, and VC-1 proposed by SMPTE (the Society of Motion Picture and Television Engineers), and others. One of the newest international standards for video coding is H.264/AVC which was approved as recommendation H.264 of ITU-T, and which was approved also as International Standard 14496-10 (MPEG-4 Part 10) Advanced Video Coding (AVC) by ISO/IEC.

Chapter 8 of Non-patent Document 1 cited below (8.7 "Deblocking filter process", pp. 138-146) describes a deblocking filter for decreasing block distortion generated at the time of image decoding, in conformity with the recommendation H.264/AVC.

Annex J of Non-patent Document 2 cited below ("Deblocking filter mode"", pp. 80-84) describes a deblocking filter in conformity with one of optional annexes (extensions) of H.263.

Furthermore, a deblocking filter of VC-1 is described in Non-patent Document 3 cited below.

FIG. 2 explains function of a deblocking filter which is in conformity with the recommendation H.264/AVC.

In the deblocking filter process which is in conformity with the recommendation H.264/AVC, as illustrated in FIG. 2, as for boundaries 201, 202, 203, and 204 of four blocks which are obtained by partitioning a 16×16-pixel macroblock into four in the column direction (vertical direction), filtering by a predetermined arithmetic expression is performed, using four pixels 209 on the left-hand side of each boundary and four pixels 210 on the right-hand side of each boundary, and eight pixels in total on both right and left sides of each boundary are rewritten by the filtering processing result. Next, as for boundaries 205, 206, 207, and 208 of four blocks which are obtained by partitioning the macroblock into four in the row direction (horizontal direction), filtering by a predetermined arithmetic expression is performed, using four pixels 211 on the bottom side of each boundary and four pixels 212 on the top side of each boundary, and eight pixels in total on both top and bottom sides of each boundary are rewritten by the filtering processing result. Therefore, in order to perform the deblocking filter process in units of macroblock, pixels of a macroblock which adjoins the top side and pixels of a macroblock which adjoins the left-hand side are required.

FIG. 16 explains function of a deblocking filter which is in conformity with H.263 Annex J.

In the deblocking filter process which is in conformity with H.263 Annex J, as illustrated in FIG. 16, as for boundaries 1605 and 1607 of two blocks which are obtained by partitioning a 16×16-pixel macroblock into two in the row direction (horizontal direction), filtering by a predetermined arithmetic expression is performed, using four pixels 1611 on the bottom side of each boundary and four pixels 1612 on the top side of each boundary, and eight pixels in total on both top and bottom sides of each boundary are rewritten by the filtering processing result. Next, as for boundaries 1601 and 1603 of two blocks which are obtained by partitioning the macroblock into two in the column direction (vertical direction), filtering by a predetermined arithmetic expression is performed, using four pixels 1609 on the left-hand side of each boundary and four pixels 1610 on the right-hand side of each boundary, and eight pixels in total on both right and left sides of each boundary are rewritten by the filtering processing result. Therefore, in order to perform the deblocking filter process in units of macroblock, pixels of a macroblock which adjoins the top side and pixels of a macroblock which adjoins the left-hand side are required, as is the case with H.264/AVC.

There are two modes in a deblocking filter process which is in conformity with VC-1.

FIG. 17 explains a function of a first mode of the deblocking filter process which is in conformity with VC-1. In the first mode, as for boundaries 1706, 1707, and 1708 of three blocks which are obtained by partitioning a 16×16-pixel macroblock into four in the row direction (horizontal direction), and as for a boundary 1705 of one block which is obtained by partitioning a macroblock adjoining the top side of the macroblock concerned into four, filtering by a predetermined arithmetic expression is performed, using four pixels 1711 on the bottom side of each boundary and four pixels 1712 on the top side of each boundary, and eight pixels in total on both top and bottom sides of each boundary are rewritten by the filtering processing result. Next, as for boundaries 1702, 1703, and 1704 of three blocks which are obtained by partitioning the macroblock into four in the column direction (vertical direction), and as for a boundary 1701 of one block which is obtained by partitioning a macroblock adjoining the left side of the macroblock concerned into four, filtering by a predetermined arithmetic expression is performed, using four pixels 1709 on the left-hand side of each boundary and four pixels 1710 on the right-hand side of each boundary, and eight pixels in total on both right and left sides of each boundary are rewritten by the filtering processing result. Therefore, in order to perform the deblocking filter process in units of macroblock, pixels of a macroblock which adjoins the top side and pixels of a macroblock which adjoins the left-hand side and pixels of a macroblock which adjoins the upper left side are required.

FIG. 18 explains a function of a second mode of the deblocking filter which is in conformity with VC-1. In the second mode, as for boundaries 1807 and 1808 of two blocks which are obtained by partitioning a 16×16-pixel macroblock into four in the row direction (horizontal direction), and boundaries 1805 and 1806 of two blocks which are obtained by partitioning a macroblock adjoining the top side of the macroblock concerned into four in the row direction (horizontal direction), filtering by a predetermined arithmetic expression is performed, using four pixels 1811 on the bottom side of each boundary and four pixels 1812 on the top side of each boundary, and eight pixels in total on both top and bottom sides of each boundary are rewritten by the filtering processing result. Next, as for boundaries 1801, 1802, 1803, and 1804 of four blocks which are obtained by partitioning a 16×16-pixel macroblock into four in the column direction (vertical direction), filtering by a predetermined arithmetic expression is performed, using four pixels 1809 on the left-hand side of each boundary and four pixels 1810 on the right-hand side of each boundary, and eight pixels in total on both right and left sides of each boundary are rewritten by the filtering processing result. Therefore, in order to perform the deblocking filter process in units of macroblock, pixels of a macroblock which adjoins the top side and pixels of a macroblock which adjoins the left-hand side are required.

On the other hand, the result of the deblocking filter process is used in a stage in which a reference decoded image is generated for a motion compensation process of the next image, at the end of decoding. Therefore, the area to which filtering is completed is outputted to an external memory.

FIG. 3 explains an area to which the filtering is completed and a range to be outputted to an external memory, in a deblocking filter process which is in conformity with the recommendation H.264/AVC, after performing filtering in a boundary between a macroblock MB11 and a macroblock MB01 which adjoins the top side of the macroblock MB11 and in a boundary between the macroblock MB11 and a macroblock MB10 which adjoins the left-hand side of the macroblock MB11.

As illustrated in FIG. 3, as a result of the deblocking filter process performed in the macroblock MB11, an area 301 for which all the filtering is completed shifts from the macroblock MB11 as a processing target and from a macroblock boundary of the macroblock MB10 adjoining the left-hand side of the macroblock MB11, and straddles the macroblock MB01 adjoining the top side and a macroblock MB00 adjoining the top left side. Therefore, the range to be outputted to the external memory shifts from the macroblock MB11 as the deblocking filtering target.

For example, Patent Document 1 cited below discloses an image decoding device which outputs to an external memory a range 302 which includes the macroblock MB10 adjoining the left-hand side of the macroblock MB11 as the deblocking filtering target, and the macroblock MB00 adjoining the top left side of the macroblock MB11, or a range 303 which straddles the macroblock MB11 as the deblocking filtering target, the macroblock MB10 adjoining the left-hand side of the macroblock MB11, a macroblock MB01 adjoining the top side of the macroblock MB11, and the macroblock MB00 adjoining the top left side of the macroblock MB11.

On the other hand, Patent Document 2 cited below discloses parallel operation performed in intra frame prediction in moving image coding/decoding which is in conformity with the recommendation H.264/AVC. The parallel operation is performed by a first moving image processing unit 2_0 which processes a first macroblock arranged in an even line and a second moving image processing unit 2_1 which processes a second macroblock arranged in the next line, In this case, a processing result by the first moving image processing unit 2_0 of plural neighboring macroblocks of the first macroblock arranged in an even line is stored into a memory unit LM. The second moving image processing unit 2_1 processes a macroblock in the next line using the stored result.

(Patent Document 1) Japanese Patent Laid-open No. 2007-258882.
(Patent Document 2) Japanese Patent Laid-open No. 2008-42571.
(Non-patent Document 1) Thomas Wiegand et al, "Draft ITU-T Recommendation and Final Draft International Standard of Joint Video Specification (ITU-T Rec. H.264|ISO/IEC 14495-10 AVC), March 2003. http://www.h2631.com/h264/JVC-G050.pdf#search='Thomas Wiegand JVTG050d35.doc', (retrieved on Jun. 1, 2009).
(Non-patent Document 2) ITU-T Recommendation H.263, "Video coding for low bit rate communication," Series H: AUDIOVISUAL AND MULTIMEDIA SYSTEM, Infrastructure of Audiovisual Services-Coding of Moving Video, INTERNATIONAL TELECOMMUNICATION UNION-TELECOMMUNICATION STANDARDIZATION SECTOR, February 1998, http://www.itu.int/rec/T-REC-H.263-199802=S/en, (retrieved on Jun. 30, 2009).
(Non-patent Document 3) SMPTE Draft Standard for Television SMPTE 421M, Proposed SMPTE Standard for Television: VC-1 Compressed Video Bitstream Format and Decoding Process, Aug. 23, 2005, http://multimedia.cx/mirror/s421m.pdf#search='SMPTE 421M draft Standard for VX1', (retrieved on Jun. 30, 2009).

SUMMARY OF THE INVENTION

In advance of the present invention, the present inventors have been engaged in research and development of a moving image processor.

In the research and development, the present inventors obtained an idea from the parallel processing by the plural moving image processing units of plural macroblocks arranged by plural lines, disclosed by Patent Document 2 cited above, and examined a method of performing a deblocking filter process in parallel for plural macroblocks arranged in plural lines by use of plural deblocking filter circuits.

FIG. 4 explains a method examined by the present inventors in advance of the present invention, for performing a deblocking filter process in parallel for plural macroblocks arranged in plural lines by use of plural deblocking filter circuits.

By the method illustrated in FIG. 4, a first deblocking filter circuit DEB1 performs a deblocking filter process to macroblocks arranged in one of odd lines (a first line, a third line, - - - ) in the horizontal direction, and in parallel with this, a second deblocking filter circuit DEB2 performs a deblocking filter process to macroblocks arranged in one of even lines (a second line, a fourth line, - - - ) in the horizontal direction. In the present parallel processing, operation timing of the second deblocking filter circuit DEB2 needs to be delayed by a deblocking filtering time of two macroblocks, compared with operation timing of the first deblocking filter circuit DEB1.

FIG. 5 explains that, in the processing method illustrated in FIG. 4, the operation timing of the second deblocking filter circuit DEB2 needs to be delayed by the processing time of two macroblocks, compared with the operation timing of the first deblocking filter circuit DEB1. FIG. 5 illustrates a state where the first deblocking filter circuit DEB1 processes the third line and the second deblocking filter circuit DEB2 processes the fourth line.

As illustrated in FIG. 5, a deblocking filter process by the first deblocking filter circuit DEB1 is applied to macroblocks, starting from a macroblock of the first column of the third row (MB20), to a macroblock of the second column (MB21), to a macroblock of the third column (MB22), and so on sequentially in the row direction (horizontal direction). A deblocking filter process by the second deblocking filter circuit DEB2 is applied to macroblocks, starting from a macroblock of the first column of the fourth row (MB30), to a macroblock of the second column (MB31), to a macroblock of the third column (MB32), and so on sequentially in the row direction (horizontal direction). However, prior to the deblocking filter process of the macroblock of the first column of the fourth row (MB30), filtering of an area 502 of four pixels of a bottom boundary of the macroblock of the first column of the third row (MB20) needs to be completed. Timing when the present filtering completes is timing when, in the area 502 of four pixels of the bottom boundary of the macroblock MB20 of the first column of the third row, four pixels of a right-hand side boundary 501 with the macroblock MB21 adjoining the right-hand side of the macroblock MB20 complete filtering. Therefore, in order to facilitate control of the deblocking filter process to macroblocks arranged in the third row and the fourth row by the first deblocking filter circuit DEB1 and the second deblocking filter circuit DEB2, the operation timing of the second deblocking filter circuit DEB2 needs to be delayed by the processing time of two macroblocks, as compared with the operation timing of the first deblocking filter circuit DEB1.

FIG. 6 illustrates an area which is transferred to an external memory by the method disclosed by Patent Document 1 described above, after completion of parallel deblocking filtering of macroblocks of the third row and the fourth row by the first deblocking filter circuit DEB1 and the second deblocking filter circuit DEB2, as illustrated in FIG. 5. Specifically, FIG. 6 illustrates the example in which the range 302 illustrated in FIG. 3 is transferred to an external memory.

In FIG. 6, an area 604 is an area which is transferred to the external memory by filtering of a macroblock MB23 of the fourth column of the third row by the first deblocking filter circuit DEB1, and, an area 605 is an area which is transferred to the external memory by filtering of a macroblock MB31 of the second column of the fourth row by the second deblocking filter circuit DEB2. The area 604 and the area 605 are arranged in positions which are displaced by two macroblocks in the column direction (vertical direction). In this way, it is necessary to transfer the filtering processing result of the area 604 and the filtering processing result of the area 605 to the external memory, as the result of the parallel deblocking filtering of plural macroblocks by the first deblocking filter circuit DEB1 and the second deblocking filter circuit DEB2. However, transferring the processing results of plural macroblocks arranged in positions which are different in the column direction (vertical direction) to an external memory increases a burden rather than transferring a single filtering processing result to an external memory.

The following explains that it is difficult to transfer, to an external memory, data of plural macroblocks (MB) of positions which are different in the column direction (vertical direction).

FIG. 13 explains a reason why transferring the processing results of plural macroblocks arranged in positions which are different in the column direction (vertical direction) to an external memory increases a burden rather than transferring a single filtering processing result to the external memory. FIG. 13 illustrates areas to be transferred to the external memory, when the first deblocking filter circuit DEB1 processes a macroblock (MB41) arranged at the second column of the fifth row and the second deblocking filter circuit DEB2 processes a macroblock (MB3 (L−1)) arranged at the L-th column of the fourth row.

In FIG. 13, an area 1305 is transferred to the external memory by filtering of the macroblock MB41 of the second column of the fifth row by the first deblocking filter circuit DEB1, and an area 1304 is transferred to the external memory by filtering of the macroblock MB3 (L−1) of the L-th column of the fourth row by the second deblocking filter circuit DEB2. The area 1304 and the area 1305 are arranged in positions which are displaced by L−2 pieces of macroblocks in the horizontal direction.

In such a data transfer to the external memory, it is necessary not only to specify the address of plural transfer destinations (destination address) of the external memory, but also to specify the address of plural transfer sources (source address) corresponding to plural macroblocks (MB) arranged in positions which are different in the column direction (vertical direction). This addressing is possible to be executed by a memory controller or a central processing unit (CPU), built in a semiconductor integrated circuit which comprises a moving image processor. However, for specification of a source address, address computation is needed, accordingly, efficiency of the data transfer to the external memory falls.

From the above reasons, when compared with an ordinary processing in which a moving image processor with a single deblocking filter circuit performs deblocking filter process to macroblocks arranged in a single line sequentially, performing deblocking filter process in parallel by plural deblocking filter circuits to plural macroblocks arranged in plural lines increases a burden of transferring a processing result of plural macroblocks to the external memory.

The present invention has been made as a result of the examination described above by the present inventors in advance of the present invention.

Therefore, the purpose of the present invention lies in facilitating a transfer of plural processing results to an external memory when parallel deblocking filtering of plural macroblocks is performed.

Another purpose of the present invention lies in reducing a burden of a transfer to an external memory when the parallel deblocking filtering of plural macroblocks is performed.

The above and other purposes and new features will become clear from the description of the specification and the accompanying drawings of the present invention.

The following explains briefly a typical invention to be disclosed by the present application.

That is, a typical embodiment of the present invention is a moving image processor (750) comprising a first moving image processing unit (719) and a second moving image processing unit (729) which are able to perform parallel operation.

When the first and the second moving image processing unit perform the parallel operation, a unit of data processed by the first and the second moving image processing unit is a macroblock of a prescribed number of pixels.

The first moving image processing unit processes sequentially first plural macroblocks (MB00, MB01, MB02, MB03, - - - ) arranged in a line of an image. The second moving image processing unit processes sequentially second plural macroblocks (MB10, MB11, MB12, MB13, - - - ) arranged in a line next to the line of the image.

The first moving image processing unit (719) and the second moving image processing unit (729) comprise a first deblocking filter (713) and a second deblocking filter (723), respectively, for reducing block distortion in image decoding (refer to FIG. 7 and FIG. 8).

Operation timing of the second deblocking filter (723) is delayed by deblocking filtering time of at least two macroblocks, compared with operation timing of the first deblocking filter (713) (refer to FIG. 9).

The moving image processor (750) comprises further a data transfer unit (725) which comprises at least a first buffer (7252) and a second buffer (7253).

A first filtering result of the first deblocking filter (713) is stored in the first buffer (7252) of the data transfer unit (725), and a second filtering result of the second deblocking filter (723) is stored in the second buffer (7253) of the data transfer unit (725).

The first filtering processing result stored in the first buffer (7252) and the second filtering processing result stored in the second buffer (7253) are transferred sequentially from the first buffer (7252) and the second buffer (7253) to an external memory, respectively (refer to FIG. 9).

The following explains briefly an effect obtained by the typical invention to be disclosed in the present application.

Namely, according to the present invention, in transferring to an external memory plural processing results of the parallel deblocking filtering applied to plural macroblocks, the first buffer (7252) and the second buffer (7253) can absorb a difference of positions in the column direction (vertical direction) of the plural macroblocks (MB) processed in parallel, and a difference of the operation timing of the first deblocking filter (713) and the second deblocking filter (723); therefore, it is possible to facilitate the transfer of the plural processing results to the external memory.

BRIEF DESCRIPTION OF THE DRAWINGS

The present invention will become fully understood from the detailed description given hereinafter and the accompanying drawings, wherein:

FIG. 3 is a drawing explaining an area to which the filtering is completed and a range to be outputted to an external memory, in a deblocking filter process which is in conformity with the recommendation H.264/AVC, after performing filtering in a boundary between a macroblock MB11 and a macroblock MB01 adjoining the top side of the macroblock MB11 and in a boundary between the macroblock MB11 and a macroblock MB10 adjoining the left-hand side of the macroblock MB11;

FIG. 10 is a drawing illustrating an area of an image outputted to the DMA controller (DMAC) 725, the first local memory (LRAM) 7133, and the line memory controller (LMC) 724, at Timing 1 of the pipeline operation of the moving image processor illustrated in FIG. 9, according to Embodiment 1 of the present invention;

FIG. 11 is a drawing illustrating an area of an image outputted to the DMA controller (DMAC) 725, the first local memory (LRAM) 7133, a second local memory (LRAM) 7233, and the line memory controller (LMC) 724, at Timing 2 of the pipeline operation of the moving image processor illustrated in FIG. 9, according to Embodiment 1 of the present invention;

DETAILED DESCRIPTION OF THE PREFERRED EMBODIMENTS

1. Summary of the Preferred Embodiments

Figure 1:
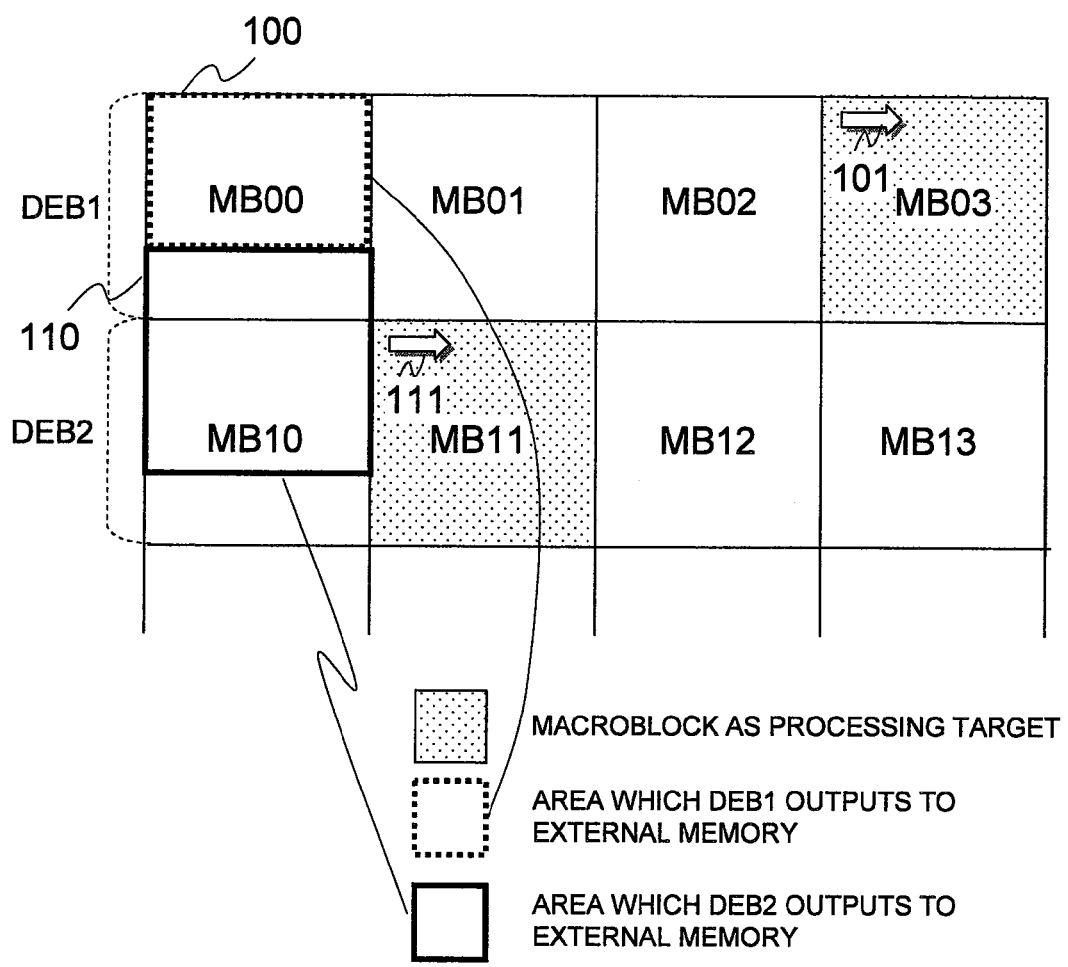
FIG. 1 is a drawing illustrating an area transferred to an external memory when transferring a processing result to an external memory, after the completion of parallel deblocking filtering of macroblocks of a first row and a second row by a first deblocking filter circuit DEB1 and a second deblocking filter circuit DEB2 of a moving image processor, illustrated in FIG. 7 and FIG. 8, according to Embodiment 1 of the present invention.

First, an outline is explained about a typical embodiment of the invention disclosed in the present application.

A reference symbol in parentheses referring to a component of the drawing in the outline explanation about the typical embodiment only illustrates what is included in the concept of the component to which the reference symbol is attached.

(1) A typical embodiment of the present invention is a moving image processor (750) comprising a first moving image processing unit (719) and a second moving image processing unit (729) which are able to perform parallel operation.

A unit of data processed by the first moving image processing unit and the second moving image processing unit when the first moving image processing unit and the second moving image processing unit perform the parallel operation comprises a macroblock of a prescribed number of pixels.

The first moving image processing unit processes sequentially first plural macroblocks (MB00, MB01, MB02, MB03, - - - ) arranged in a line of an image. The second moving image processing unit processes sequentially second plural macroblocks (MB10, MB11, MB12, MB13, - - - ) arranged in a line next to the line of the image.

Figure 7:
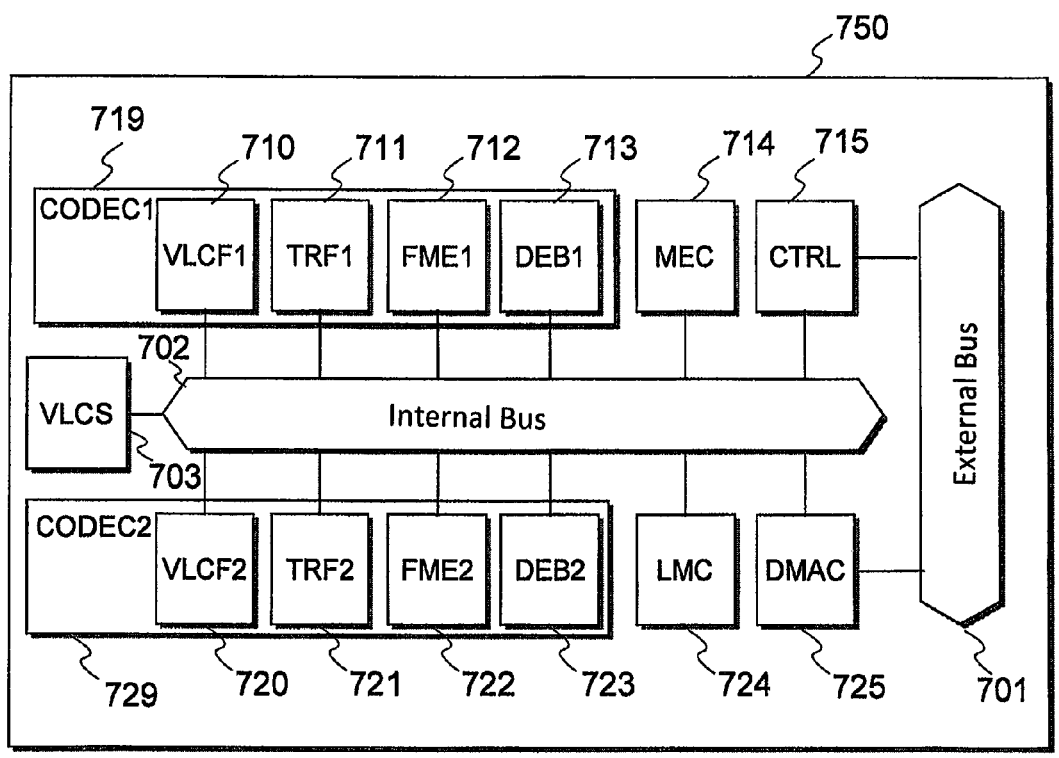
FIG. 7 is a drawing illustrating a basic configuration of a moving image processor according to Embodiment 1 of the present invention.
Figure 8:
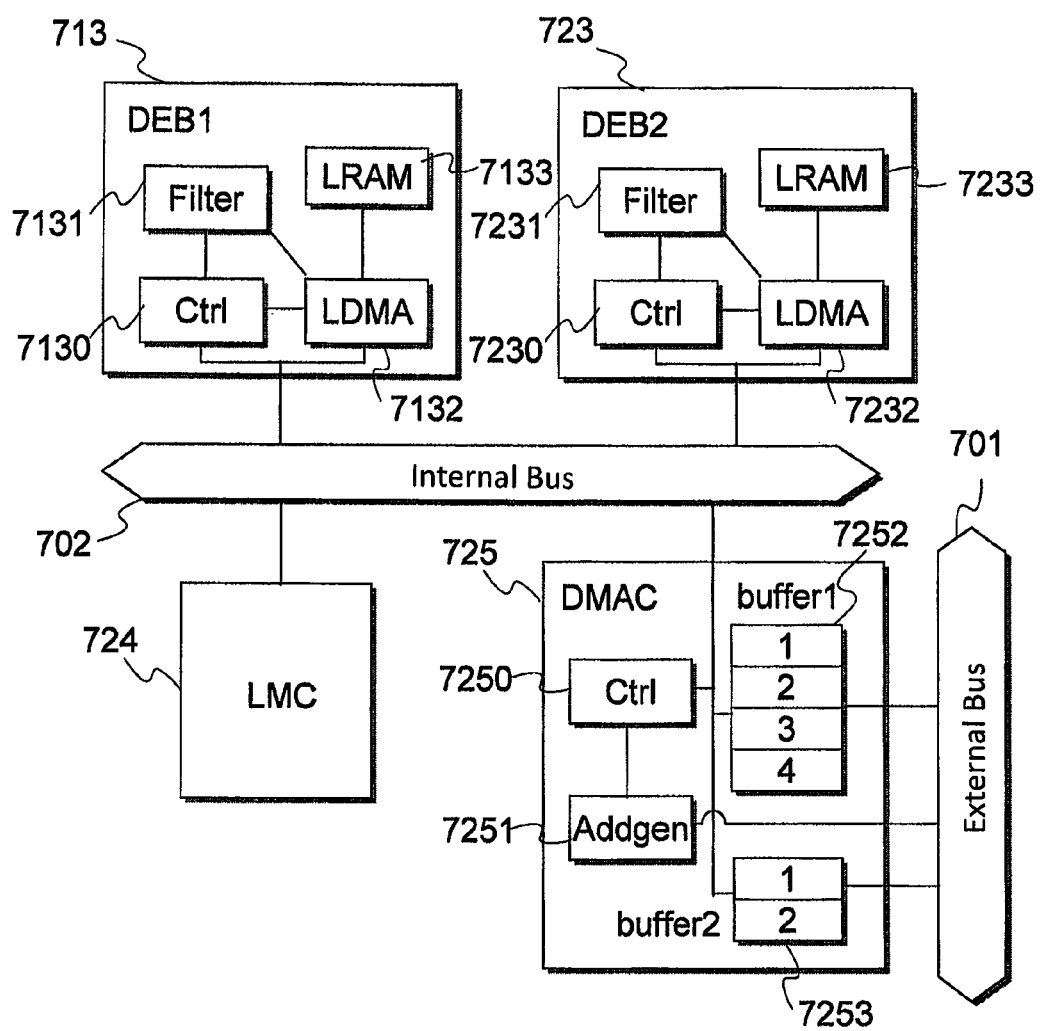
FIG. 8 is a drawing illustrating a detailed configuration of the principal parts of the moving image processors illustrated in FIG. 7, according to Embodiment 1 of the present invention.

The first moving image processing unit (719) and the second moving image processing unit (729) comprise respectively a first deblocking filter (713) and a second deblocking filter (723) for reducing block distortion in image decoding (refer to FIG. 7 and FIG. 8).

Figure 9:
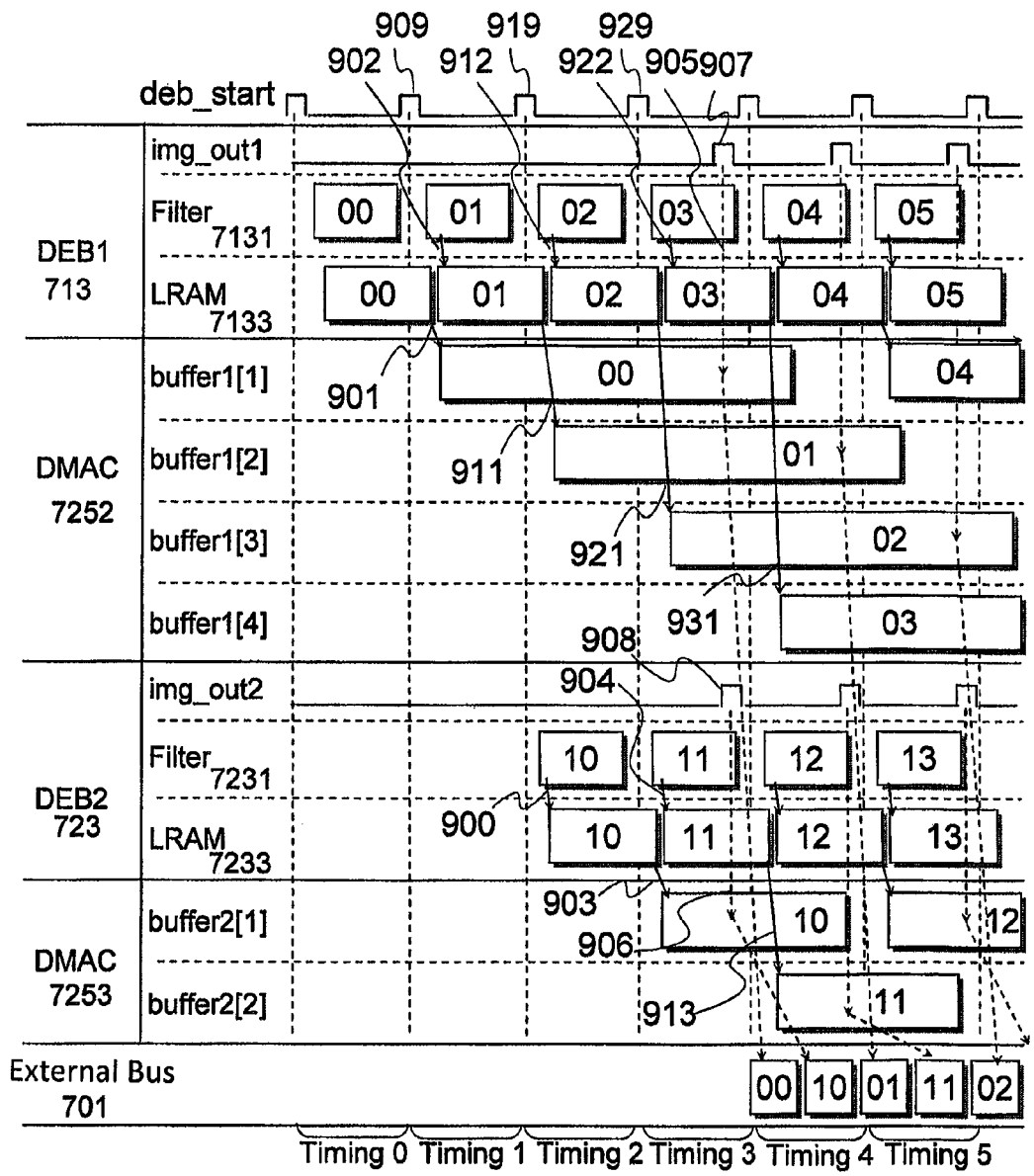
FIG. 9 is a drawing explaining pipeline operation of a first deblocking filter (DEB1) 713, a second deblocking filter (DEB2) 723, and a DMA controller (DMAC) 725 of the moving image processor illustrated in FIG. 7 and FIG. 8, according to Embodiment 1 of the present invention.

Operation timing of the second deblocking filter (723) is delayed by deblocking filtering time of at least two macroblocks, compared with operation timing of the first deblocking filter (713) (refer to FIG. 9).

The moving image processor (750) comprises further a data transfer unit (725) which comprises at least a first buffer (7252) and a second buffer (7253).

A first filtering result of the first deblocking filter (713) is stored in the first buffer (7252) of the data transfer unit (725), and a second filtering result of the second deblocking filter (723) is stored in the second buffer (7253) of the data transfer unit (725).

The first filtering processing result stored in the first buffer (7252) and the second filtering processing result stored in the second buffer (7253) are transferred sequentially from the first buffer (7252) and the second buffer (7253) to an external memory, respectively (refer to FIG. 9).

According to the present embodiment, in transferring to an external memory processing results of the parallel deblocking filtering applied to plural macroblocks, the first buffer (7252) and the second buffer (7253) can absorb a difference of positions in the column direction (vertical direction) of the plural macroblocks (MB) processed in parallel, and a difference of the operation timing of the first deblocking filter (713) and the second deblocking filter (723); therefore, it is possible to facilitate the transfer of the plural processing results to an external memory.

In a preferred embodiment, a first storage capacity of the first buffer (7252) is set larger than a second storage capacity of the second buffer (7253) by a prescribed storage capacity at least, and the prescribed storage capacity is capable of storing the first filtering result (00, 01) generated by the first deblocking filter (713) during the delay of the operation timing of the second deblocking filter (723) (refer to FIG. 9).

According to the preferred embodiment, it becomes possible to absorb a delay of the operation timing of the second deblocking filter (723).

In another preferred embodiment, the first deblocking filter (713), the second deblocking filter (723), and the data transfer unit (725) perform pipeline operation.

The first buffer (7252) and the second buffer (7253) of the data transfer unit (725) hold the first filtering result (00) and the second filtering result (10) in parallel, during one time slot (Timing 3) of the pipeline operation.

The first filtering result (00) held in the first buffer (7252) and the second filtering result (10) held in the second buffer (7253) are transferred sequentially to the external memory by the data transfer unit (725) during another time slot (Timing 4) next to the one time slot (Timing 3) of the pipeline operation (refer to FIG. 9).

In a more preferred embodiment, the first deblocking filter (713) and the first buffer (7252) of the data transfer unit (725) perform the pipeline operation to process the macroblock sequentially in a prescribed processing period (Timing 0-Timing 3), and the second deblocking filter (723) and the second buffer (7253) of the data transfer unit (725) perform the pipeline operation to process the macroblock sequentially in the prescribed processing period (Timing 0-Timing 2).

In another processing period (Timing 4-) the prescribed processing period (Timing 0-Timing 3), the first filtering result of the first deblocking filter (713) and the second filtering result of the second deblocking filter (723) are transferred sequentially from the first buffer (7252) and the second buffer (7253) to the external memory, respectively (refer to FIG. 9).

In another more preferred embodiment, the first moving image processing unit (719) further comprises a first variable length coding/decoding unit (710), a first frequency conversion unit (711), and a first motion compensation unit (712), respectively; and the second moving image processing unit (729) further comprises a second variable length coding/decoding unit (720), a second frequency conversion unit (721) and a second motion compensation unit (722), respectively (refer to FIG. 7).

The first variable length coding/decoding unit (710), the first frequency conversion unit (711), the first motion compensation unit (712), and the first deblocking filter (713), all of which the first moving image processing unit (719) comprises, and the second variable length coding/decoding unit (720), the second frequency conversion unit (721), the second motion compensation unit (722), and the second deblocking filter (723), all of which the second moving image processing unit (729) comprises, perform the pipeline operation to process the macroblock sequentially during the prescribed processing period (refer to FIG. 9).

In the moving image processor (750) according to the another more preferred embodiment, the first deblocking filter (713) and the second deblocking filter (723) comprise internally a first memory (7133) and a second memory (7233), respectively.

Figure 12:
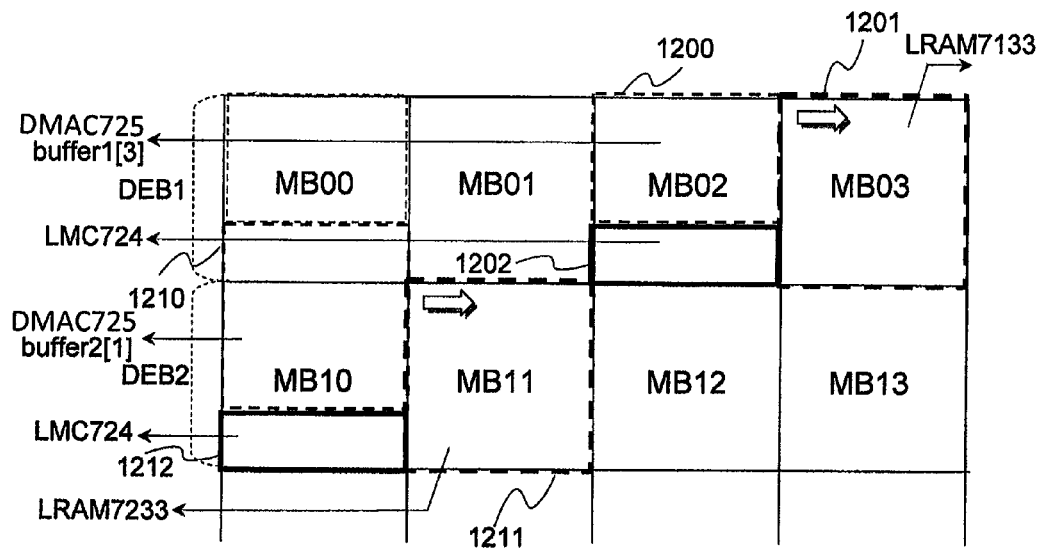
FIG. 12 is a drawing illustrating an area of an image outputted to the DMA controller (DMAC) 725, the first local memory (LRAM) 7133, the second local memory (LRAM) 7233, and the line memory controller (LMC) 724, at Timing 3 of the pipeline operation of the moving image processor illustrated in FIG. 9, according to Embodiment 1 of the present invention.
Figure 13:
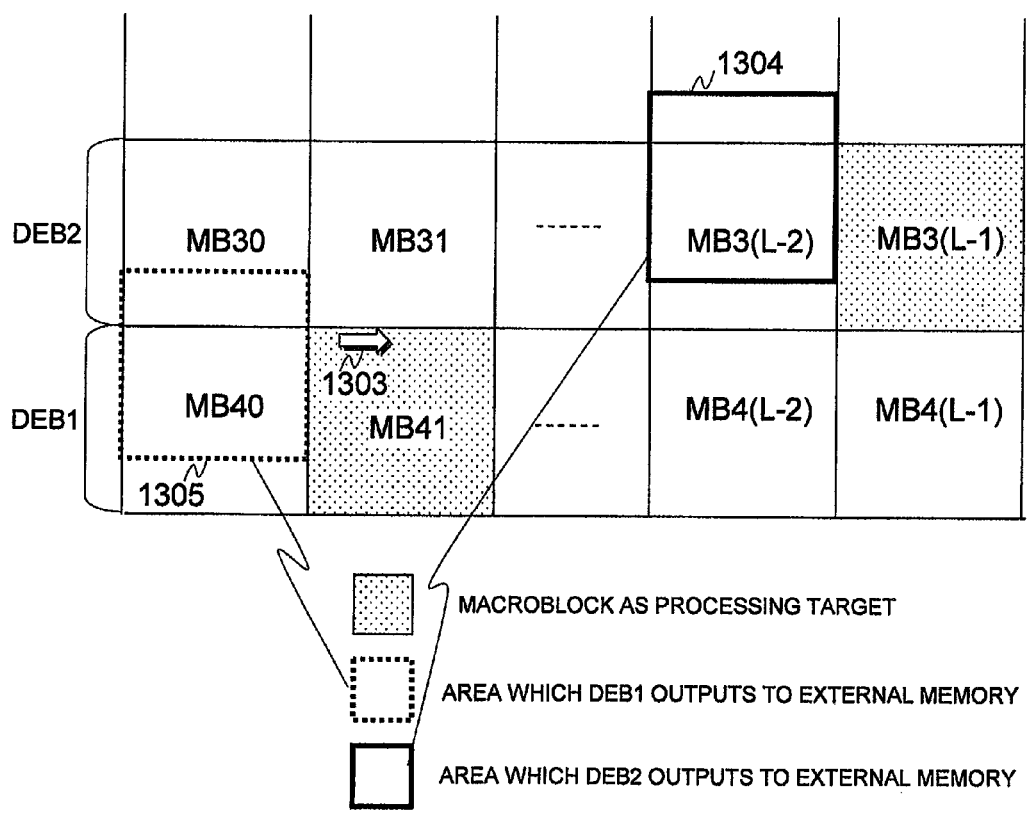
FIG. 13 is a drawing for explaining a reason that transferring to an external memory processing results of plural macroblocks (MB) arranged in positions which are different in the column direction (vertical direction) increases a burden rather than transferring to an external memory a filtering processing result by a moving image processor comprising a single deblocking filter circuit.

Data of a macroblock (MB00) as the processing target of filtering by the first deblocking filter (713) is stored in the first memory (7133) for use in the next filtering of a macroblock (MB01) as the next processing target, and data of a macroblock (MB10) as the processing target of filtering by the second deblocking filter (723) is stored in the second memory (7233) for use in the next filtering of a macroblock (MB11) as the next processing target (refer to FIG. 10, FIG. 11, and FIG. 12).

A moving image processor (750) according to further another preferred embodiment comprises another memory (724) coupled to the first moving image processing unit (719) and the second moving image processing unit (729).

Data of an area (1202) at a bottom boundary of a macroblock (MB02) arranged in the one line filtered by the first deblocking filter (713) is stored in the another memory (724) for use in intra frame prediction of a macroblock (MB12, MB13) arranged in the next line. Data of an area (1212) at a bottom boundary of a macroblock (MB10) arranged in the next line filtered by the second deblocking filter (723) is stored in the another memory (724) for use in intra frame prediction of a macroblock (MB20, MB21) arranged in a further next line of the next line (refer to FIG. 10, FIG. 11, and FIG. 12).

In a specific embodiment, the first moving image processing unit (719), the second moving image processing unit (729), and the data transfer unit (725) are integrated on a semiconductor substrate of a semiconductor integrated circuit configuring the moving image processor (750) (refer to FIG. 7).

In a more specific embodiment, the data transfer unit (725) is a direct memory access controller (DMAC) (refer to FIG. 7).

In a most specific embodiment, the external memory is a synchronous dynamic random access memory (SDRAM) capable of being coupled to the semiconductor integrated circuit.

(2) A typical embodiment of another viewpoint of the present invention is a processing method of a moving image processor (750) which comprises a first moving image processing unit (719) and a second moving image processing unit (729) which are able to perform parallel operation.

A unit of data processed by the first moving image processing unit and the second moving image processing unit when the first moving image processing unit and the second moving image processing unit perform the parallel operation comprises a macroblock of a prescribed number of pixels.

The first moving image processing unit processes sequentially first plural macroblocks (MB00, MB01, MB02, MB03, - - - ) arranged in a line of an image. The second moving image processing unit processes sequentially second plural macroblocks (MB10, MB11, MB12, MB13, - - - ) arranged in a line next to the line of the image.

The first moving image processing unit (719) and the second moving image processing unit (729) comprise respectively a first deblocking filter (713) and a second deblocking filter (723) for reducing block distortion in image decoding (refer to FIG. 7 and FIG. 8).

Operation timing of the second deblocking filter (723) is delayed by deblocking filtering time of at least two macroblocks, compared with operation timing of the first deblocking filter (713) (refer to FIG. 9).

The moving image processor (750) comprises further a data transfer unit (725) which comprises at least a first buffer (7252) and a second buffer (7253).

A first filtering result of the first deblocking filter (713) is stored in the first buffer (7252) of the data transfer unit (725), and a second filtering result of the second deblocking filter (723) is stored in the second buffer (7253) of the data transfer unit (725).

The first filtering processing result stored in the first buffer (7252) and the second filtering processing result stored in the second buffer (7253) are transferred sequentially from the first buffer (7252) and the second buffer (7253) to an external memory, respectively (refer to FIG. 9).

According to the embodiment, in transferring to an external memory processing results of the parallel deblocking filtering applied to plural macroblocks, the first buffer (7252) and the second buffer (7253) can absorb a difference of positions in the column direction (vertical direction) of the plural macroblocks (MB) processed in parallel, and a difference of the operation timing of the first deblocking filter (713) and the second deblocking filter (723); therefore, it is possible to facilitate the transfer of the plural processing results to an external memory.

2. Further Detailed Description of the Preferred Embodiments

Next, embodiments are explained further in full detail. In the entire drawings for explaining the preferred embodiments of the present invention, the same symbol is attached to a component which has the same function, and the repeated explanation thereof is omitted.

Embodiment 1

<<A Basic Configuration of a Moving Image Processor>>

FIG. 7 illustrates a basic configuration of a moving image processor according to Embodiment 1 of the present invention.

A moving image processor 750 illustrated in FIG. 7 comprises a variable length coding/decoding unit (VLCS) 703, a first moving image processing unit (CODEC1) 719, a second moving image processing unit (CODEC2) 729, a memory control unit (MEC) 714, a line memory controller (LMC) 724, an overall controller (CTRL) 715, a DMA controller (DMAC) 725, and an internal bus 702. According to a preferred embodiment, the moving image processor 750 is configured in a form of a large-scale semiconductor integrated circuit (LSI) formed on a semiconductor substrate, such as a single crystal silicon substrate, for example.

<<Variable Length Coding/Decoding Unit>>

The variable length coding/decoding unit (VLCS) 703 is supplied with moving image coded data in a form of a bit stream (BS) via the DMA controller 725 from media, such as a hard disk drive (HDD), an optical disk drive, a large-capacity nonvolatile flash memory, and a wireless LAN (local area network). A stream analyzing unit is built in the variable length coding/decoding unit (VLCS) 703. The stream analyzing unit supplies macroblocks arranged in odd rows (the first row, the third row, - - - ) to the first moving image processing unit (CODEC1) 719, and macroblocks arranged in even rows (the second row, the fourth row, - - - ) to the second moving image processing unit (CODEC2) 729.

A pipeline control unit is built in the variable length coding/decoding unit (VLCS) 703. The pipeline control unit controls pipeline operation for parallel operation of the first moving image processing unit (CODEC1) 719 and the second moving image processing unit (CODEC2) 729 in processing macroblocks. That is, a first variable length coding/decoding unit (VLCF1) 710, a first frequency conversion unit (TRF1) 711, a first motion compensation unit (FME1) 712, and a first deblocking filter (DEB1) 713, which are an internal circuit of the first moving image processing unit (CODEC1) 719, perform pipeline operation under the control of the pipeline control unit of the variable length coding/decoding unit (VLCS) 703. A second variable length coding/decoding unit (VLCF2) 720, a second frequency conversion unit (TRF2) 721, a second motion compensation unit (FME2) 722, and a second deblocking filter (DEB2) 723, which are an internal circuit of the second moving image processing unit (CODEC2) 729, perform pipeline operation under the control of the pipeline control unit of the variable length coding/decoding unit (VLCS) 703.

The variable length coding/decoding unit (VLCS) 703 has a function to extract a macroblock type and a motion vector by performing variable length decoding of the bit stream supplied, and to calculate values of a group of parameters necessary for the first moving image processing unit (CODEC1) 719 and the second moving image processing unit (CODEC2) 729 in the latter stages.

<<Variable Length Coding/Decoding Unit>>

The first variable length coding/decoding unit (VLCF1) 710 and the second variable length coding/decoding unit (VLCF2) 720, which are supplied with macroblocks in odd rows and even rows respectively from the variable length coding/decoding unit (VLCS) 703, perform context-based adaptive variable length coding/decoding to decode motion vector information, a macroblock parameter, and frequency conversion information.

<<Frequency Conversion Unit>>

The first frequency conversion unit (TRF1) 711 and the second frequency conversion unit (TRF2) 721 are supplied with the frequency conversion information from the first variable length coding/decoding unit (VLCF1) 710 and the second variable length coding/decoding unit (VLCF2) 720, respectively, and perform inverse quantization (IQ) and inverse discrete cosine transformation (IDCT). Namely, the first frequency conversion unit (TRF1) 711 and the second frequency conversion unit (TRF2) 721 process quantization conversion coefficients and quantization parameters as the frequency conversion information which is supplied from the first variable length coding/decoding unit (VLCF1) 710 and the second variable length coding/decoding unit (VLCF2) 720, respectively, perform inverse quantization conversion to calculate the conversion coefficients, perform inverse orthogonal transform of the calculated conversion coefficients to calculate a pixel value or an inter frame prediction residual, add the inter frame prediction residual to a reference image which is supplied from the first motion compensation unit (FME1) 712 and the second motion compensation unit (FME2) 722, to calculate a pixel value, and output the calculated image.

<<Motion Compensation Unit>>

The first motion compensation unit (FME1) 712 and the second motion compensation unit (FME2) 722 perform a motion compensation process. Namely, the first motion compensation unit (FME1) 712 and the second motion compensation unit (FME2) 722 execute a motion search to calculate a reference image at a position indicated by a motion vector, through the use of a reference image supplied from an external memory via the memory control unit (MEC) 714, the internal bus 702, the DMA controller (DMAC) 725, and an external bus 701. The first motion compensation unit (FME1) 712 and the second motion compensation unit (FME2) 722 output the reference image calculated, to the first frequency conversion unit (TRF1) 711 and the second frequency conversion unit (TRF2) 721, respectively.

<<Deblocking Filter>>

The first deblocking filter (DEB1) 713 and the second deblocking filter (DEB2) 723 perform deblocking filter process for decreasing block distortion produced at the time of image decoding. Namely, the first deblocking filter (DEB1) 713 and the second deblocking filter (DEB2) 723 perform the deblocking filter process, using image data of a macroblock (MB) as a processing target supplied from the first frequency conversion unit (TRF1) 711 and the second frequency conversion unit (TRF2) 721 and image data of a macroblock (MB) on the left-hand side of the processing target supplied from the first local memory (LRAM) 7133 and the second local memory (LRAM) 7233 which will be explained in FIG. 8. A decoded image as a filtering result of the macroblock (MB) on the left-hand side of the processing target is transferred to an external memory via the internal bus 702, the DMA controller (DMAC) 725, and the external bus 701. The filtering result of the macroblock (MB) as the processing target is stored in the first local memory (LRAM) 7133 and the second local memory (LRAM) 7233 (to be explained in FIG. 8) via the internal bus 702, for use in filtering of a macroblock of the next processing target.

<<Memory Control Unit>>

The memory control unit (MEC) 714 supplies a reference image for use in inter frame prediction, which is obtained from information on a motion vector supplied from the first variable length coding/decoding unit (VLCF1) 710 and the second variable length coding/decoding unit (VLCF2) 720, to the first motion compensation unit (FME1) 712 and the second motion compensation unit (FME2) 722 from the external memory via the internal bus 702, the DMA controller (DMAC) 725, and the external bus 701.

<<Overall Controller>>

The overall controller (CTRL) 715 controls operation of all the internal circuits of the moving image processor 750. Especially, the overall controller (CTRL) 715 generates an operation control signal (deb_start) which controls operation of the first deblocking filter (DEB1) 713 and the second deblocking filter (DEB2) 723.

<<Line Memory Controller>>

The line memory controller (LMC) 724 stores a parameter related to a processing result of the first moving image processing unit (CODEC1) 719 about a macroblock (MB) of an odd row, and transfers a parameter related to an image necessary for the second moving image processing unit (CODEC2) 729 about a macroblock (MB) of an even row. The line memory controller (LMC) 724 also stores a parameter related to a processing result of the second moving image processing unit 729 (CODEC2) about a macroblock (MB) of an even row, and transfers a parameter related to an image necessary for the first moving image processing unit (CODEC1) 719 about a macroblock (MB) of an odd row. Accordingly, the line memory controller (LMC) 724 stores data of a macroblock (MB) to be used for the deblocking filtering, and is coupled to a static random access memory (SRAM) held in the moving image processor 750, as described in Patent Document 2 cited above.

<<DMA Controller>>

The DMA controller (DMAC: direct memory access controller) 725 is used, as is the case with the DMA controller described in Patent Document 2 cited above, for a high-speed data transfer of a bit stream including a large quantity of macroblocks (MB) between an external memory (for example, a synchronous dynamic random access memory (SDRAM)) coupled to the external bus 701 of the moving image processor 750 and the first moving image processing unit (CODEC1) 719 or the second moving image processing unit (CODEC2) 729.

<<A Detailed Configuration of the Principal Parts of the Moving Image Processors>>

FIG. 8 illustrates a detailed configuration of the first deblocking filter (DEB1) 713, the second deblocking filter (DEB2) 723, and the DMA controller (DMAC) 725 of the moving image processor 750 illustrated in FIG. 7.

<<A Shared Line Memory Controller>>

As explained in FIG. 7, the first moving image processing unit (CODEC1) 719 and the second moving image processing unit (CODEC2) 729 share the line memory controller (LMC) 724 for intra frame prediction.

<<A Detailed Configuration of the Deblocking Filter>>

The first deblocking filter (DEB1) 713 comprises a first filter circuit 7131 which performs deblocking filter arithmetic processing on image data supplied from the first frequency conversion unit (TRF1) 711, a first local memory (LRAM) 7133 which stores an operation result of the first filter circuit 7131, a first local DMA circuit 7132 which controls operation of transferring an operation result of the first filter circuit 7131 to the first local memory (LRAM) 7133, and a first control circuit 7130 which controls operation of the first filter circuit 7131 and the first local DMA circuit 7132.

The second deblocking filter (DEB2) 723 comprises a second filter circuit 7231 which performs deblocking filter arithmetic processing on image data supplied from the second frequency conversion unit (TRF2) 721, a second local memory (LRAM) 7233 which stores an operation result of the second filter circuit 7231, a second local DMA circuit 7232 which controls operation of transferring an operation result of the second filter circuit 7231 to the second local memory (LRAM) 7233, and a second control circuit 7230 which controls operation of the second filter circuit 7231 and the second local DMA circuit 7232.

<<A Detailed Configuration of the DMA Controller>>

The DMA controller (DMAC) 725 comprises, as a configuration necessary for the deblocking filter process, a first buffer 7252 which stores image data transferred from the first deblocking filter (DEB1) 713, a second buffer 7253 which stores image data transferred from the second deblocking filter (DEB2) 723, an address generation circuit (addgen) 7251 which generates an address of the external memory, and a control circuit 7250 which controls operation of the first buffer 7252, the second buffer 7253, and the address generation circuit 7251. The first buffer 7252 and the second buffer 7253 are coupled with the external bus 701 of the moving image processor 750. Accordingly, data stored in the first buffer 7252 and the second buffer 7253 can be transferred to a prescribed storing area of SDRAM as an external memory via the external bus 701. The storing area of the external memory can be specified by a value of an address which the address generation circuit 7251 of the DMA controller (DMAC) 725 generates. The DMA controller (DMAC) 725 has also a function for supplying data to the variable length coding/decoding unit (VLCS) 703 and the memory control unit (MEC) 714. The detailed description of the configuration thereof is omitted.

<<Operation of the Moving Image Processor>>

Next, operation of the moving image processor illustrated in FIG. 7 and FIG. 8 according to Embodiment 1 of the present invention is explained.

Figure 5:
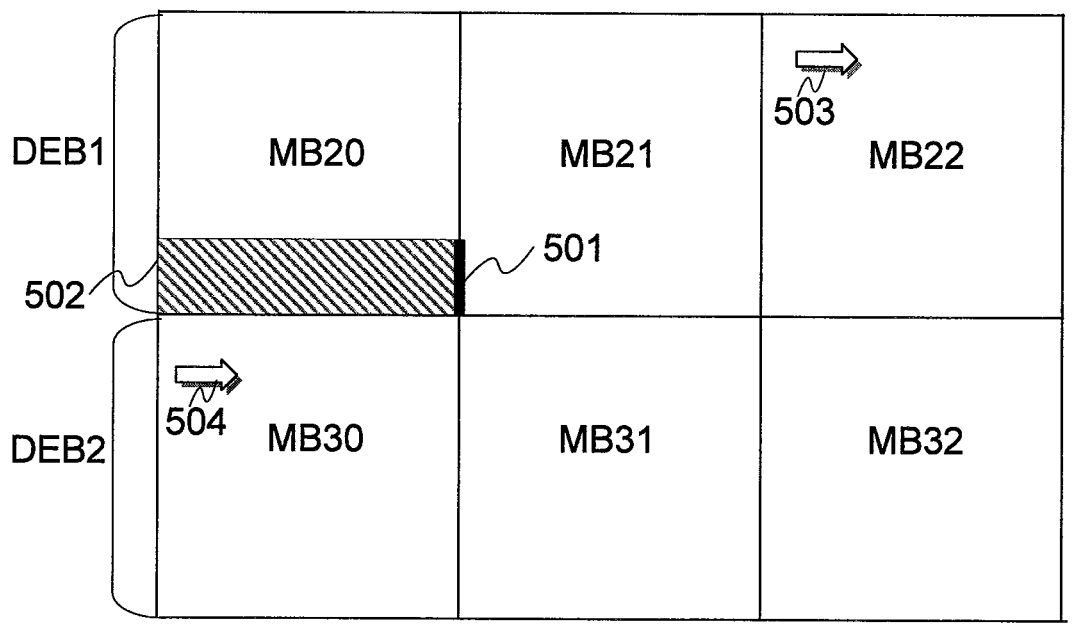
FIG. 5 is a drawing for explaining that, in the processing method illustrated in FIG. 4, the operation timing of the second deblocking filter circuit DEB2 needs to be delayed by the processing time of two macroblocks, compared with the operation timing of the first deblocking filter circuit DEB1.
Figure 6:
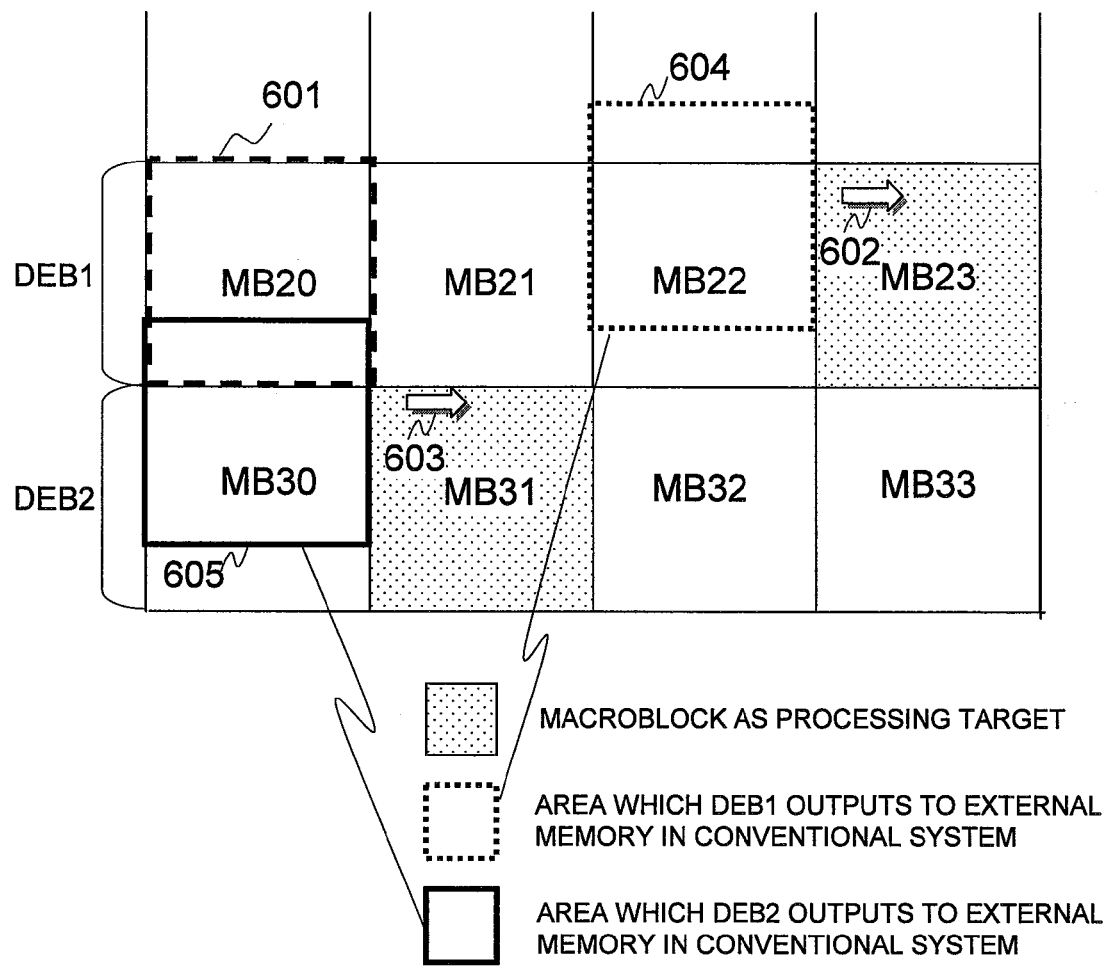
FIG. 6 is a drawing illustrating an area to be transferred to an external memory, when transferring to an external memory an area of a macroblock which adjoins the left-hand side of a macroblock as a processing target, among areas disclosed by Patent Document 1 among filtering processing results, specifically an area 302 illustrated in FIG. 3, immediately after the completion of parallel deblocking filtering of macroblocks of a third row and a fourth row by the first deblocking filter circuit DEB1 and the second deblocking filter circuit DEB2, illustrated in FIG. 5.

First, when a bit stream which includes a macroblock as a decoding target is supplied from the external memory to the variable length coding/decoding unit (VLCS) 703 via the internal bus 702, the DMA controller (DMAC) 725, and the external bus 701, operation of the first moving image processing unit (CODEC1) 719 is started. On the other hand, as explained in FIG. 5, operation timing of the second deblocking filter (DEB2) 723 needs to be delayed by the processing time of two macroblocks, as compared with the first deblocking filter (DEB1) 713. Therefore, it is necessary to start the second moving image processing unit (CODEC2) 729 after the first moving image processing unit (CODEC1) 719 has completed the processing for two macroblocks.

Accordingly, in the first moving image processing unit (CODEC1) 719, the first variable length coding/decoding unit (VLCF1) 710 performs the variable length decoding of a macroblock (MB), the first motion compensation unit (FME1) 712 performs a motion search and calculates a reference image at a position indicated by the motion vector, and the first frequency conversion unit (TRF1) 711 performs inverse quantization and inverse orthogonal transform. When a macroblock (MB) as the processing target is an intra macroblock, intra image prediction is performed using the reference image, and an image is outputted. On the other hand, when a macroblock (MB) as the processing target is an inter macroblock, the motion compensation process is performed using the reference image and the inter frame prediction residual, and an image is outputted. The first deblocking filter (DEB1) 713 performs the deblocking filter process, using image data of a macroblock (MB) as the processing target supplied from the first frequency conversion unit (TRF1) 711 and image data of a macroblock (MB) on the left-hand side of the processing target supplied from the first local memory (LRAM) 7133. A decoded image as the filtering result of the macroblock (MB) on the left-hand side of the processing target is transferred to the external memory via the internal bus 702, the DMA controller (DMAC) 725, and the external bus 701. On the other hand, the filtering result of the macroblock (MB) as the processing target is stored in the first local memory (LRAM) 7133 via the internal bus 702 for use in filtering of a macroblock as the next processing target.

After the first moving image processing unit (CODEC1) 719 has completed the processing for two macroblocks, operation of the second moving image processing unit (CODEC2) 729 is started. Accordingly, in the second moving image processing unit (CODEC2) 729, the second variable length coding/decoding unit (VLCF2) 720 performs variable length decoding of a macroblock, the second motion compensation unit (FME2) 722 performs a motion search and calculates a reference image at a position indicated by the motion vector, the second frequency conversion unit (TRF2) 721 performs inverse quantization and inverse orthogonal transform. When a macroblock (MB) as the processing target is an intra macroblock, intra image prediction is performed using the reference image, and an image is outputted. On the other hand, when a macroblock (MB) as the processing target is an inter macroblock, the motion compensation process is performed using the reference image and the inter frame prediction residual, and an image is outputted. The second deblocking filter (DEB2) 723 performs the deblocking filter process, using image data of a macroblock (MB) as the processing target supplied from the second frequency conversion unit (TRF2) 721 and image data of a macroblock (MB) on the left-hand side of the processing target supplied from the second local memory (LRAM) 7233. A decoded image as the filtering result of the macroblock (MB) on the left-hand side of the processing target is transferred to the external memory via the internal bus 702, the DMA controller (DMAC) 725, and the external bus 701. On the other hand, the filtering result of the macroblock (MB) as the processing target is stored in the second local memory (LRAM) 7233 via the internal bus 702 for use in filtering of a macroblock as the next processing target.

<<Pipeline Operation>>

FIG. 9 explains pipeline operation of the first deblocking filter (DEB1) 713, the second deblocking filter (DEB2) 723, and the DMA controller (DMAC) 725 of the moving image processor illustrated in FIG. 7 and FIG. 8, according to Embodiment 1 of the present invention.

Figure 4:
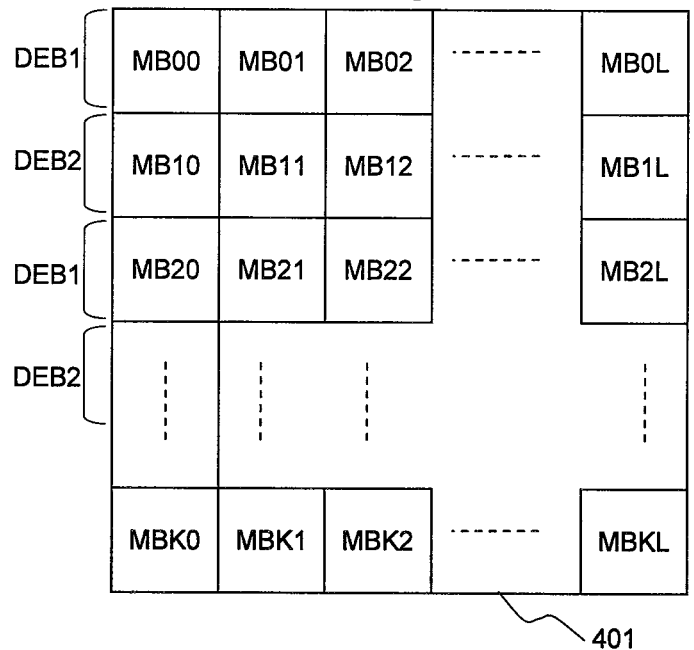
FIG. 4 is a drawing explaining a method examined by the present inventors in advance of the present invention, for performing a parallel deblocking filter process for plural macroblocks arranged in plural lines by plural deblocking filter circuits.

The pipeline operation illustrated in FIG. 9 assumes the start point at a position of a macroblock (MB) "01" of the second column next to a macroblock (MB) "00" of the first column of the first row as an odd row of the image illustrated in FIG. 4.

<Timing 1>

Figure 2:
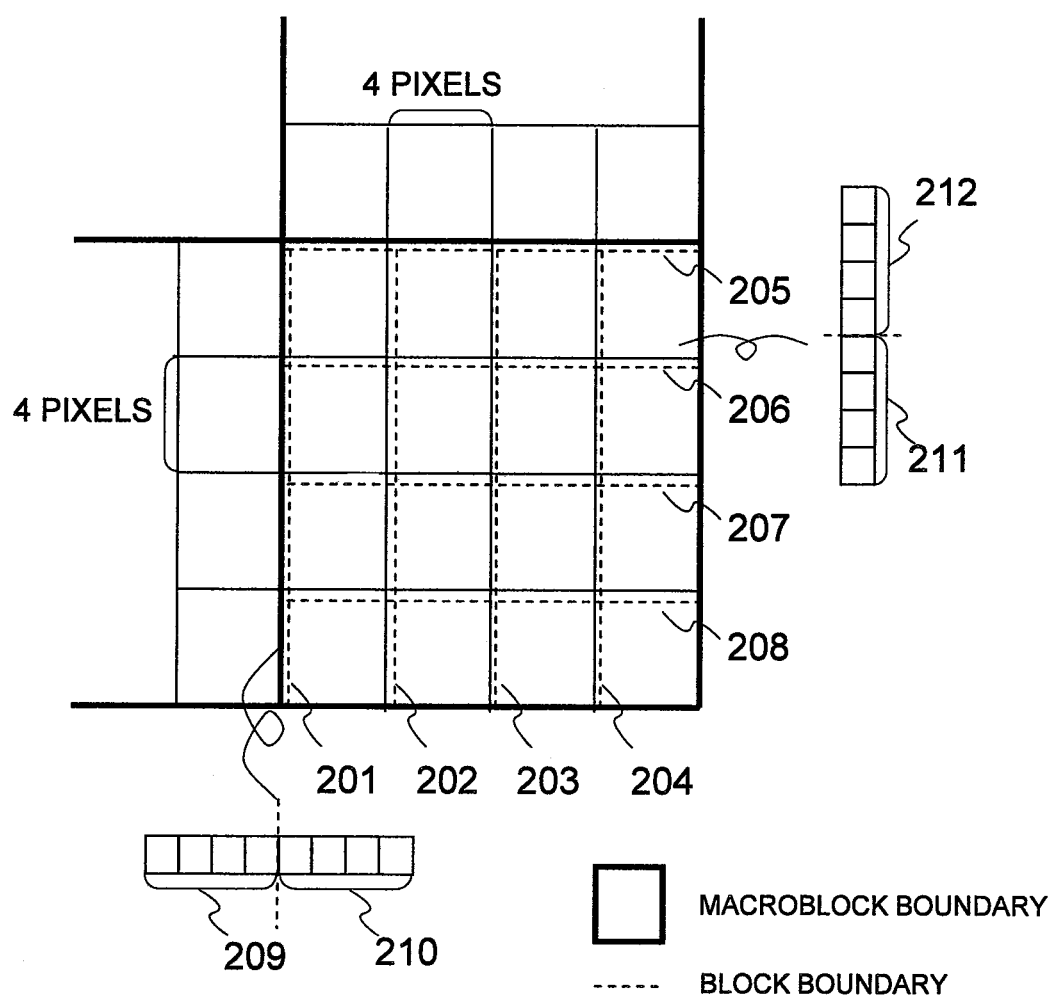
FIG. 2 is a drawing explaining function of a deblocking filter which is in conformity with the recommendation H.264/AVC.

First, at the timing of a rising 909 of the operation control signal (deb_start) supplied from the overall controller (CTRL) 715, operation of the first deblocking filter (DEB1) 713 is started. Then, the first filter circuit 7131 performs a deblocking filter process, using a macroblock (the macroblock (MB) "00" in the present case) on the left-hand side of a macroblock of the processing target supplied from the first local memory (LRAM) 7133 via the first local DMA circuit 7132 and a macroblock as the processing target (the macroblock (MB) "01" in the present case) supplied from the first frequency conversion unit (TRF1) 711. When the processing target is a macroblock (MB) "20" of the first column or the subsequent one of the third row, data on the top side of the macroblock as the processing target supplied from the line memory controller (LMC) 724 is also used. The deblocking filter process is performed to the boundary of the dashed line of FIG. 2 as described above, when conforming with the recommendation H.264/AVC, for example.

FIG. 10 illustrates an area of the image to be outputted to the DMA controller (DMAC) 725, the first local memory (LRAM) 7133, and the line memory controller (LMC) 724, at Timing 1 of the pipeline operation of the moving image processor illustrated in FIG. 9, according to Embodiment 1 of the present invention.

After the completion of the deblocking filter process of the macroblock (MB) "01" as the processing target by the first filter circuit 7131, data of an area 1000 of the upper part of the macroblock (MB) "00" on the left-hand side of the processing target illustrated in FIG. 10 is outputted, as indicated by an arrow 901 of FIG. 9, to the first entry of the first buffer 7252 (buffer1 [1]) of the DMA controller (DMAC) 725 from the first local memory (LRAM) 7133 via the first local DMA circuit 7132.

After that, the first control circuit 7130 outputs the data of the first entry of the first buffer 7252 (buffer1 [1]) of the DMA controller (DMAC) 725 (that is the data of the area 1000 of the macroblock (MB) "00" illustrated in FIG. 10) to the external memory via the external bus 701, at Timing 4 after a rising 907 of an image output signal img_out1 which is generated by using a coordinate of a frame, as indicated by an arrow 905 of FIG. 9. The data of the area 1000 of FIG. 10 outputted to the external memory is used for generation of a reference decoded image for the motion compensation process.

On the contrary, at Timing 1, data of an area 1001 of the macroblock (MB) "01" as the processing target illustrated in FIG. 10 is outputted from the first filter circuit 7131 to the first local memory (LRAM) 7133 via the first local DMA circuit 7132 as indicated by an arrow 902 of FIG. 9, for use in the deblocking filter process of a macroblock (MB) "02" as the next processing target. Furthermore, data of an area 1002 of the bottom boundary of the macroblock (MB) "00" illustrated in FIG. 10 is outputted to the line memory controller (LMC) 724. The outputted data is used for intra frame prediction between a macroblock (MB) "10" of the first column of the second row as an even row and a macroblock (MB) "11" of the second column, performed by the second moving image processing unit (CODEC2) 729, and also used for the deblocking filter process of the macroblock (MB) "10" of the first column of the second row as an even row, performed by the second deblocking filter (DEB2) 723.

<Timing 2>

Next, operation to the macroblock (MB) "02" is started at the timing of a next rising 919 of the operation control signal (deb_start) supplied from the overall controller (CTRL) 715. Then, the first filter circuit 7131 performs the deblocking filter process, using the macroblock (MB) "02" as the processing target supplied from the first frequency conversion unit (TRF1) 711 and the macroblock (MB) "01" on the left-hand side of the processing target supplied from the first local memory (LRAM) 7133 via the first local DMA circuit 7132.

FIG. 11 illustrates an area of an image to be outputted to the DMA controller (DMAC) 725, the first local memory (LRAM) 7133, the second local memory (LRAM) 7233, and the line memory controller (LMC) 724, at Timing 2 of the pipeline operation of the moving image processor illustrated in FIG. 9, according to Embodiment 1 of the present invention.

After the completion of the deblocking filter process of the macroblock (MB) "02" as the processing target by the first filter circuit 7131, data of an area 1100 of the upper part of the macroblock (MB) "01" on the left-hand side of the processing target illustrated in FIG. 11 is outputted, as indicated by an arrow 911 of FIG. 9, to the second entry of the first buffer 7252 (buffer1 [2]) of the DMA controller (DMAC) 725 from the first local memory (LRAM) 7133 via the first local DMA circuit 7132.

After that, the first control circuit 7130 outputs the data of the second entry of the first buffer 7252 (buffer1 [2]) (that is the data of the area 1100 of the macroblock (MB) "01" illustrated in FIG. 11) to the external memory via the external bus 701, at Timing after a second rising of the image output signal img_out1 which is generated by using the coordinate of the frame. The data of the area 1100 of FIG. 11 outputted to the external memory is used for generation of a reference decoded image for the motion compensation process.

On the contrary, at Timing 2, data of an area 1101 of the macroblock (MB) "02" as the processing target illustrated in FIG. 11 is outputted from the first filter circuit 7131 to the first local memory (LRAM) 7133 via the first local DMA circuit 7132 as indicated by an arrow 912 of FIG. 9, for use in deblocking filter process of a macroblock (MB) "03" as the next processing target. Furthermore, data of an area 1102 of the bottom boundary of the macroblock (MB) "01" illustrated in FIG. 11 is outputted to the line memory controller (LMC) 724. The outputted data is used for intra frame prediction between the macroblock (MB) "11" of the second column of the second row as an even row and a macroblock (MB) "12" of the third column, performed by the second moving image processing unit (CODEC2) 729, and also used for the deblocking filter process of the macroblock (MB) "11" of the second row as an even row, performed by the second deblocking filter (DEB2) 723.

On the contrary, at the timing of the second rising 919 of the operation control signal (deb_start) supplied from the overall controller (CTRL) 715, operation by the second deblocking filter (DEB2) 723 is started to the macroblock (MB) "10" of the first column of the second row as an even row of the image illustrated in FIG. 4. Then, the deblocking filter process is performed using the data of the macroblock (MB) "10" as the processing target supplied from the second frequency conversion unit (TRF2) 721. After the completion of the deblocking filter process of the macroblock (MB) "10" as the processing target by the second filter circuit 7231, an area 1111 of the macroblock (MB) "10" as the processing target illustrated in FIG. 11 is outputted from the second filter circuit 7231 to the second local memory (LRAM) 7233 via the second local DMA circuit 7232 as indicated by an arrow 900 of FIG. 9, for use in the deblocking filter process of the macroblock (MB) "11" as the next processing target.

<Timing 3>

Next, operation to the macroblock (MB) "03" is started at the timing of a next rising 929 of the operation control signal (deb_start) supplied from the overall controller (CTRL) 715. Then, the first filter circuit 7131 performs the deblocking filter process, using the macroblock (MB) "03" as the processing target supplied from the first frequency conversion unit (TRF1) 711 and the macroblock (MB) "02" on the left-hand side of the processing target, supplied from the first local memory (LRAM) 7133 via the first local DMA circuit 7132.

FIG. 12 illustrates an area of an image to be outputted to the DMA controller (DMAC) 725, the first local memory (LRAM) 7133, the second local memory (LRAM) 7233, and the line memory controller (LMC) 724, at Timing 3 of the pipeline operation of the moving image processor illustrated in FIG. 9, according to Embodiment 1 of the present invention.

After the completion of the deblocking filter process of the macroblock (MB) "03" as the processing target by the first filter circuit 7131, data of an area 1200 of the macroblock (MB) "02" on the left-hand side of the processing target illustrated in FIG. 12 is outputted, as indicated by an arrow 921 of FIG. 9, to the third entry of the first buffer 7252 (buffer1 [3]) of the DMA controller (DMAC) 725 from the first local memory (LRAM) 7133 via the first local DMA circuit 7132.

Then, the first control circuit 7130 outputs the data of the third entry of the first buffer 7252 (buffer1 [3]) (that is the data of the area 1200 of the macroblock (MB) "02" illustrated in FIG. 12) to the external memory via the external bus 701, at Timing 6 (not shown) after a third rising of the image output signal img_out1 which is generated by using the coordinate of the frame. The data of the area 1200 of FIG. 12 outputted to the external memory is used for generation of a reference decoded image for the motion compensation process.

On the contrary, at Timing 3, data of an area 1201 of the macroblock (MB) "03" as the processing target illustrated in FIG. 12 is outputted from the first filter circuit 7131 to the first local memory (LRAM) 7133 via the first local DMA circuit 7132 as indicated by an arrow 922 of FIG. 9, for use in the deblocking filter process of a macroblock (MB) "04" as the next processing target. Furthermore, data of an area 1202 of the bottom boundary of the macroblock (MB) "02" illustrated in FIG. 12 is outputted to the line memory controller (LMC) 724. The outputted data is used for intra frame prediction between a macroblock (MB) "12" of the third column of the second row as an even row and a macroblock (MB) "13" of the fourth column, performed by the second moving image processing unit (CODEC2) 729, and also used for the deblocking filter process of the macroblock (MB) "12" of the second row as an even row, performed by the second deblocking filter (DEB2) 723.

On the other hand, at the timing of the third rising 929 of the operation control signal (deb_start) supplied from the overall controller (CTRL) 715, operation by the second deblocking filter (DEB2) 723 is started to the second macroblock (MB) "11" of the second row as an even row of the image illustrated in FIG. 4. Then, the second filter circuit 7231 performs the deblocking filter process, using the macroblock (MB) "11" as the processing target supplied from the second frequency conversion unit (TRF2) 721 and the macroblock (MB) "10" on the left-hand side of the processing target supplied from the second local memory (LRAM) 7233 via the second local DMA circuit 7232.

After the completion of the deblocking filter process of the macroblock (MB) "11" as the processing target by the second filter circuit 7231, an area 1211 of the macroblock (MB) "11" as the processing target illustrated in FIG. 12 is outputted from the second filter circuit 7231 to the second local memory (LRAM) 7233 via the second local DMA circuit 7232 as indicated by an arrow 904 of FIG. 9, for use in the deblocking filter process of the macroblock (MB) "12" as the next processing target.

After the completion of the deblocking filter process of the macroblock (MB) "11" as the processing target by the second filter circuit 7231, data of an area 1210 of the upper part of the macroblock (MB) "10" on the left-hand side of the processing target illustrated in FIG. 12 is outputted, as indicated by an arrow 903 of FIG. 9, to the first entry of the second buffer 7253 (buffer2 [1]) of the DMA controller (DMAC) 725 from the second local memory (LRAM) 7233 via the second local DMA circuit 7232.

Then, at Timing 4 after a first rising 908 of the image output signal img_out2 which is generated by using the coordinate of the frame, the second control circuit 7230 outputs data of the first entry of the second buffer 7253 (buffer2 [1]) (that is the data of the area 1210 of the upper part of the macroblock (MB) "10" on the left-hand side of the processing target illustrated in FIG. 12) to the external memory via the external bus 701. The data of the area 1210 of FIG. 12 outputted to the external memory is used for generation of a reference decoded image for the motion compensation process.

Furthermore, data of an area 1212 of the bottom boundary of the macroblock (MB) "10" illustrated in FIG. 12 is outputted to the line memory controller (LMC) 724. The outputted data is used for intra frame prediction between the macroblock (MB) "20" of the first column of the third row as an odd row and a macroblock (MB) "21" of the second column, performed by the second moving image processing unit (CODEC2) 729, and also used for deblocking filter process of the macroblock (MB) "20" of the first column of the third row as an odd row, performed by the first deblocking filter (DEB2) 713. After Timing 5, the same operation as in Timing 4 is repeated.

<Timing 4>

FIG. 1 illustrates an area transferred to the external memory when transferring a processing result to the external memory, after the completion of parallel deblocking filtering of macroblocks of the first row and the second row by the first deblocking filter circuit DEB1 and the second deblocking filter circuit DEB2 of the moving image processor, illustrated in FIG. 7 and FIG. 8, according to Embodiment 1 of the present invention.

At Timing 4 of the pipeline operation illustrated in FIG. 9, data of the area 100 of the macroblock (MB) "00" of the first column of the first row of FIG. 1 (refer to the area 1000 of FIG. 10) and data of the area 110 of the upper part of the macroblock (MB) "10" of the first column of the second row in FIG. 1 (refer to the area 1210 of FIG. 12) are outputted to the external memory from the first entry of the first buffer 7252 (buffer1 [1]) and the first entry of the second buffer 7253 (buffer2 [1]) of the DMAC controller (DMAC) 725. In this way, the first buffer 7252 and the second buffer 7253 of the DMAC controller (DMAC) 725 output, sequentially to the external memory at Timing 4, data of areas 100 and 110 of the macroblocks (MB) "00" and "10" of the same first column of the first row and the second row, processed by the first and the second deblocking filters (DEB1, DEB2) 713 and 723. In this case, plural destination addresses of the external memory can be easily specified by the address generation circuit 7251 of the DMAC controller (DMAC) 725 illustrated in FIG. 8, and plural source addresses can be easily specified by a suitable pointer of the DMAC controller (DMAC) 725 specifying the first entry of the first buffer 7252 (buffer1 [1]) and the first entry of the second buffer 7253 (buffer2 [1]) of the DMAC controller (DMAC) 725.

<Timing 5>

Next, at Timing 5 of the pipeline operation illustrated in FIG. 9, data of the area of the macroblock (MB) "01" of the second column of the first row of FIG. 1 (refer to the area 1100 of FIG. 11) and data of the area of the upper part of the macroblock (MB) "11" of the second column of the second row of FIG. 1 are outputted to the external memory from the second entry of the first buffer 7252 (buffer1 [2]) and the second entry of the second buffer 7253 (buffer2 [2]) of the DMAC controller (DMAC) 725. Also in this case, the first buffer 7252 and the second buffer 7253 of the DMAC controller (DMAC) 725 output, sequentially to the external memory at Timing 5, data of the areas of the macroblocks (MB) "01" and "11" of the same second column of the first row and the second row, processed by the first and the second deblocking filters (DEB1, DEB2) 713 and 723. Also in this case, plural destination addresses of the external memory can be easily specified by the address generation circuit 7251 of the DMAC controller (DMAC) 725 illustrated in FIG. 8, and plural source addresses can be easily specified by a suitable pointer of the DMAC controller (DMAC) 725 specifying the second entry of the first buffer 7252 (buffer1 [2]) and the second entry of the second buffer 7253 (buffer2 [2]) of the DMAC controller (DMAC) 725.

Next, another embodiment will be explained in full detail in which three or more pieces of moving image processing units are employed to perform parallel operation. In the entire drawings for explaining the preferred embodiments of the present invention, the same symbol is attached to a component which has the same function, and the repeated explanation thereof is omitted.

Embodiment 2

<<A Basic Configuration of a Moving Image Processor>>

Figure 14:
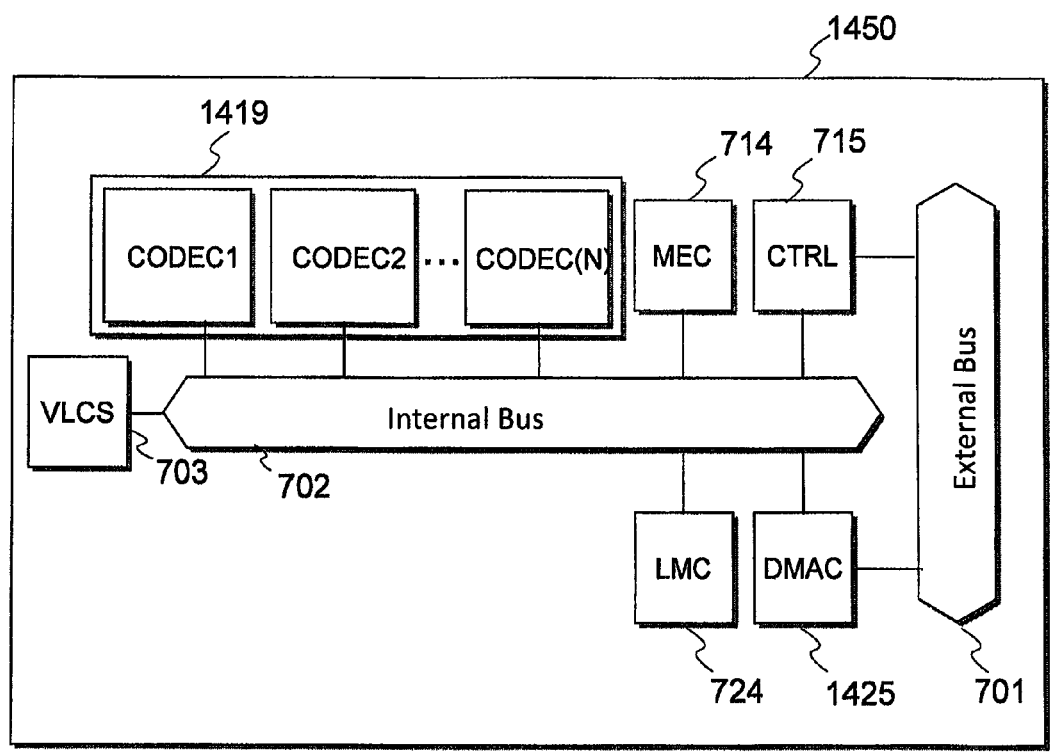
FIG. 14 is a drawing illustrating a basic configuration of a moving image processor according to Embodiment 2 of the present invention.

FIG. 14 illustrates a basic configuration of a moving image processor according to Embodiment 2 of the present invention.

A moving image processor 1450 illustrated in FIG. 14 comprises a variable length coding/decoding unit (VLCS) 703, N pieces of moving image processing units (CODEC1, CODEC2, - - -, CODECN) 1419 which are able to perform parallel operation, a line memory controller (LMC) 724, an overall controller (CTRL) 715, a DMA controller (DMAC) 1425, a memory control unit (MEC) 714, an external bus 701, and an internal bus 702.

The moving image processor 1450 illustrated in FIG. 14 is configured with three or more pieces of moving image processing units, by adding another one or more pieces of moving image processing units to the moving image processor 750 according to Embodiment 1 illustrated in FIG. 7. Henceforth, the number of the moving image processing units is written as N pieces. According to a preferred embodiment, the moving image processor 1450 is configured in a form of a large-scale semiconductor integrated circuit (LSI) formed on a semiconductor substrate, such as a single crystal silicon substrate, for example. The moving image processing units (CODEC1, CODEC2, - - -, CODECN) 1419 have the same internal configuration and the same function as the first moving image processing unit (CODEC1) 719 illustrated in FIG. 7.

<<A Detailed Configuration of a DMA Controller>>

Figure 15:
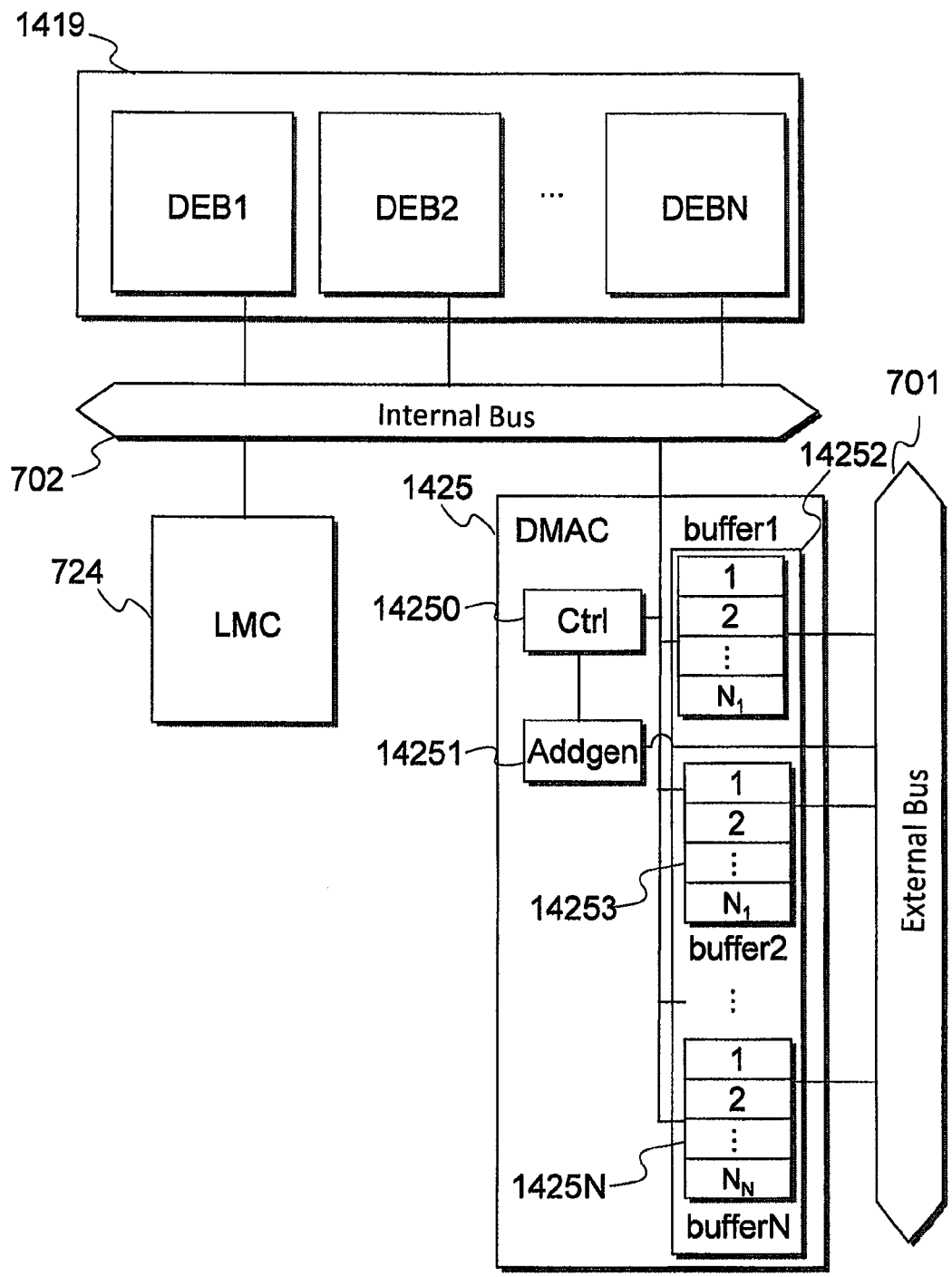
FIG. 15 is a drawing illustrating a detailed configuration of a DMA controller (DMAC) 1425 of a moving image processor illustrated in FIG. 14, according to Embodiment 2 of the present invention.
Figure 16:
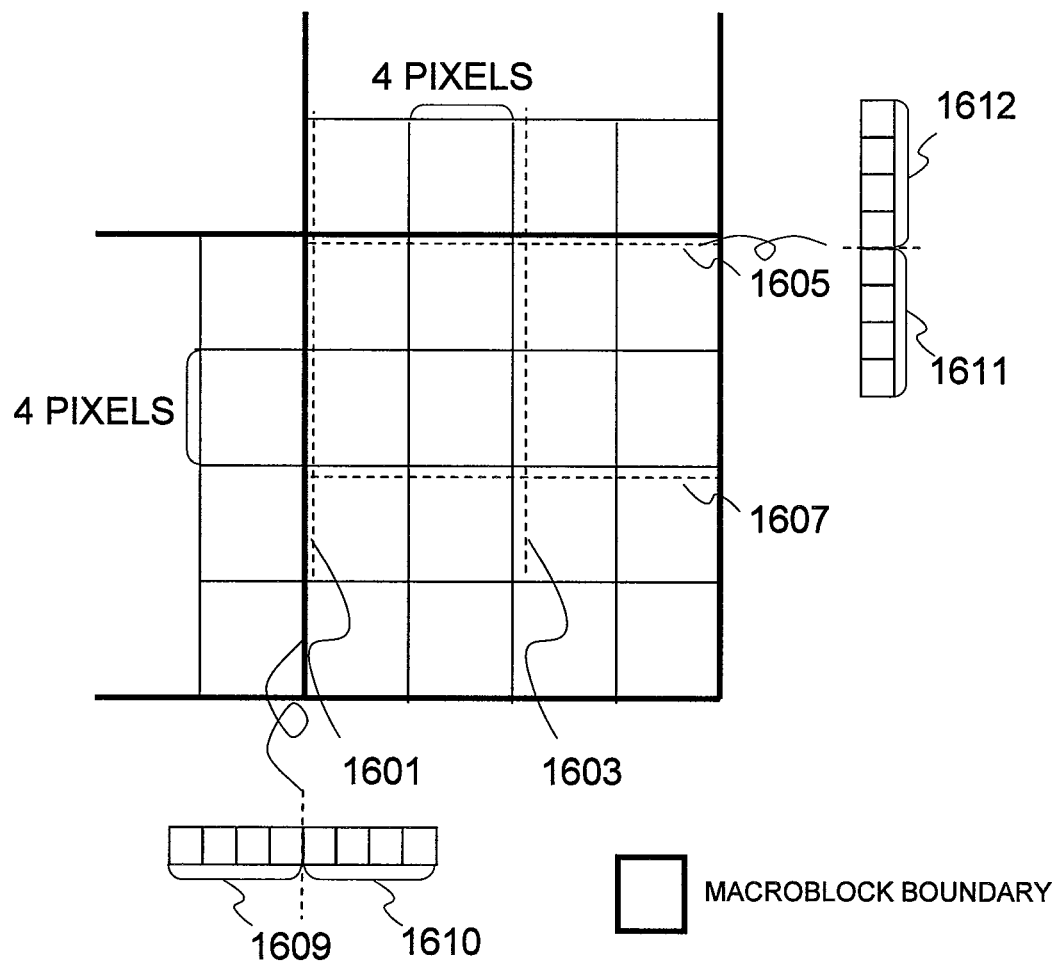
FIG. 16 is a drawing explaining function of a deblocking filter which is in conformity with H.263 Annex J.
Figure 17:
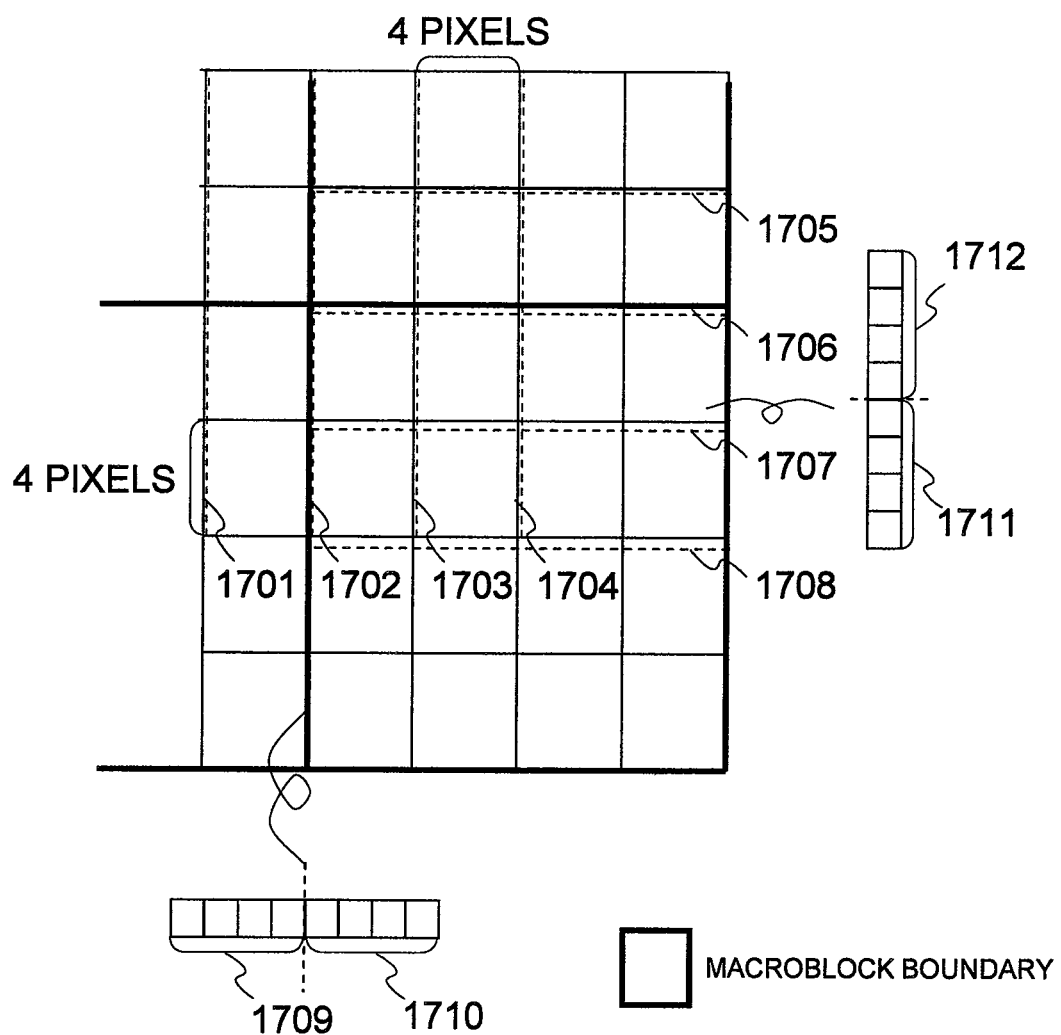
FIG. 17 is a drawing explaining a function of a first mode of a deblocking filter in conformity with VC-1.
Figure 18:
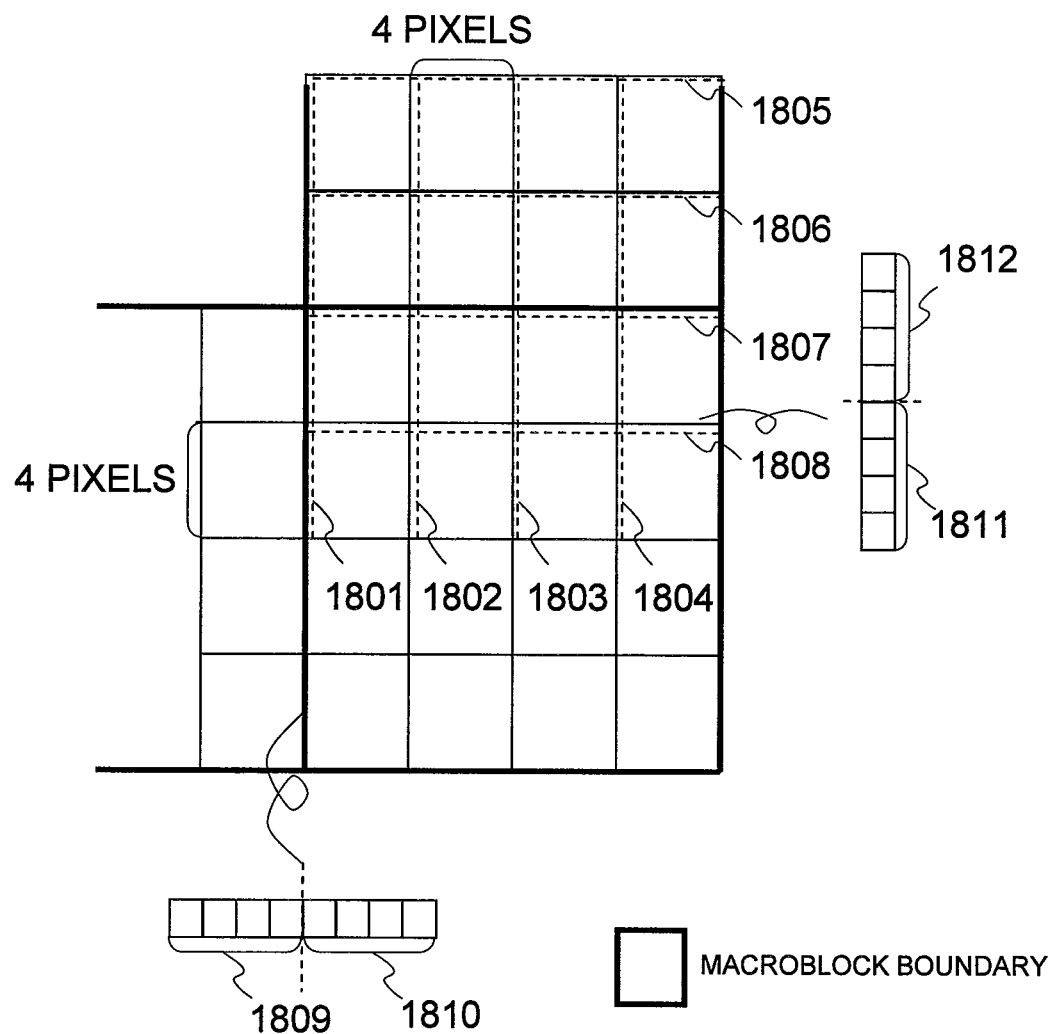
FIG. 18 is a drawing explaining a function of a second mode of the deblocking filter in conformity with VC-1.

FIG. 15 illustrates a detailed configuration of a DMA controller (DMAC) 1425 of the moving image processor 1450 illustrated in FIG. 14.

The DMA controller (DMAC) 1425 is used for a high-speed data transfer of a bit stream including a large quantity of macroblocks (MB) between an external memory (for example, a synchronous dynamic random access memory (SDRAM)) coupled to the external bus 701 of the moving image processor 1450 and the N-piece moving image processing units (CODEC1, CODEC2, - - -, CODECN) 1419 which are able to perform parallel operation. The DMA controller (DMAC) 1425 comprises, as a configuration necessary for a deblocking filter process, N-piece buffers 14252, 14253, - - -, 14252N which store image data transferred from N-piece deblocking filters (DEB1, DEB2, - - -, DEBN) 1413, an address generation circuit (addgen) 14251 which generates an address of the external memory, and a control circuit 14250 which controls operation of the N-piece buffers 14252, 14253, - - - 14252N and the address generation circuit 14251. Since the N-piece buffers 14252, 14253, - - -, 14252N are coupled to the external bus 701 of the moving image processor 750, it is possible to transfer data stored in the N-piece buffers 14252, 14253, - - -, 14252N, to a prescribed storing area of the SDRAM as the external memory via the external bus 701. The storing area of the external memory can be specified with a value of an address generated by the address generation circuit 14251 of the DMA controller (DMAC) 725. The DMA controller (DMAC) 1425 also has a function for supplying data to the variable length coding/decoding unit (VLCS) 703 and the memory control unit (MEC) 714. However, description of a configuration which realizes the function is omitted.

In Embodiment 1, the processing results by two deblocking filters are outputted to the external memory from two buffers of the DMA controller (DMAC) 725. In a case where four or more moving image processing units which perform parallel operation are provided, it is possible to respond to the case by changing the number of buffers of the DMA controller (DMAC) 725 which outputs to the external memory. For example, when eight moving image processing units which perform parallel operation are provided, it is assumed that the first moving image processing unit (CODEC1), the third moving image processing unit (CODEC3), the fifth moving image processing unit (CODEC5), and the seventh moving image processing unit (CODEC7) process macroblocks of odd rows sequentially. While, it is assumed that the second moving image processing unit (CODEC2), the fourth moving image processing unit (CODEC4), the sixth moving image processing unit (CODEC6), and the eighth moving image processing unit (CODEC8) process macroblocks of even rows sequentially. In this case, three systems can be considered as follows: System (A): processing results of macroblocks (MB) of the same column of two rows processed by two deblocking filters are outputted to an external memory, System (B): processing results of macroblocks (MB) of the same column of four rows processed by four deblocking filters are outputted to an external memory, and System (C): processing results of macroblocks (MB) of the same column of eight rows processed by eight deblocking filters are outputted to an external memory.

System (A): When the processing results of macroblocks (MB) of the same column of two rows are outputted to an external memory by two deblocking filters, the processing results of macroblocks (MB) of the same column of two rows of the first odd row and the first even row are outputted to the external memory by the first and the second deblocking filters (DEB1, DEB2), the processing results of macroblocks (MB) of the same column of two rows of the next odd row and the next even row are outputted to the external memory by the third and the fourth deblocking filters (DEB3, DEB4), the processing results of macroblocks (MB) of the same column of two rows of the further next odd row and the further next even row are outputted to the external memory by the fifth and the sixth deblocking filters (DEB5, DEB6), and the processing results of macroblocks (MB) of the same column of two rows of the yet further next odd row and the yet further next even row are outputted to the external memory by the seventh and the eighth deblocking filters (DEB7, DEB8). At this time, the number of the entry of buffer (i) in the DMA controller (DMAC) 1425 which stores a processing result of the i-th deblocking filter (i=1, 2, 3, . . . , 8) is given by (2−(i mod 2)+1)×2. Here, (K mod N) indicates the remainder of division of K by N.

System (B): When the processing results of macroblocks (MB) of the same column of four rows are outputted to an external memory by four deblocking filters, the processing results of macroblocks (MB) of the same column of four rows of the first odd row, the first even row, the next odd row, and the next even row are outputted to the external memory by the first, the second, the third, and the fourth deblocking filters (DEB1, DEB2, DEB3, DEB4), and the processing results of macroblocks (MB) of the same column of four rows of the further next odd row, the further next even row, the yet further next odd row, and the yet further next even row are outputted to the external memory by the fifth, the sixth, the seventh, and the eighth deblocking filters (DEB5, DEB6, DEB7, DEB8). At this time, the number of the entry of buffer (i) in the DMA controller (DMAC) 1425 which stores a processing result of the i-th deblocking filter (i=1, 2, 3, ..., 8) is given by (4−(i mod 4)+1)×2.

System (C): When the processing results of macroblocks (MB) of the same column of eight rows are outputted to an external memory by eight deblocking filters, the processing results of macroblocks (MB) of the same column of the first row, the second row, the third row, the fourth row, the fifth row, the sixth row, the seventh row, and the eighth row are outputted to the external memory, by the first, the second, the third, the fourth, the fifth, the sixth, the seventh, and the eighth deblocking filters (DEB1, DEB2, DEB3, DEB4, DEB5, DEB6, DEB7, DEB8). At this time, the number of the entry of buffer (i) in the DMA controller (DMAC) 1425 which stores a processing result of the i-th deblocking filter (i=1, 2 and 3, ..., K) is given by (K−(i mod K)+1)×2.

As described above, the invention accomplished by the present inventors has been concretely explained based on various embodiments. However, it cannot be overemphasized that the present invention is not restricted to the embodiments, and it can be changed variously in a range which does not deviate from the gist of the invention.

For example, in Embodiment 1 described above, the second deblocking filter (DEB2) 723 of the second moving image processing unit (CODEC2) 729 is started after the processing for two macroblocks is completed by the first deblocking filter (DEB1) 713 of the first moving image processing unit (CODEC1) 719. The present invention is not limited to this case, however, and the second deblocking filter (DEB2) 723 may be started after the processing of three or more macroblocks is completed by the first deblocking filter (DEB1) 713.

What is claimed is:

1. A moving image processor comprising:
a first moving image-processing unit and a second moving image processing unit which are operable to perform parallel operation; and
a data transfer unit,
wherein a unit of data processed by the first moving image processing unit and the second moving image processing unit when the first moving image processing unit and the second moving image processing unit perform the parallel operation comprises a macroblock of a prescribed number of pixels,
wherein the first moving image processing unit processes sequentially a first plurality of macroblocks arranged in a line of an image and the second moving image processing unit processes sequentially a second plurality of macroblocks arranged in a line next to the line of the image,
wherein the first moving image processing unit and the second moving image processing unit comprise, respectively, a first deblocking filter and a second deblocking filter, for use in decreasing block distortion in image decoding,
wherein operation timing of the second deblocking filter is delayed by a deblocking filtering time of at least two macroblocks, compared with operation timing of the first deblocking filter,
wherein the data transfer unit comprises at least a first buffer and a second buffer,
wherein a first filtering result of the first deblocking filter is stored in the first buffer of the data transfer unit and a second filtering result of the second deblocking filter is stored in the second buffer of the data transfer unit,
wherein the first filtering result stored in the first buffer and the second filtering result stored in the second buffer are transferred sequentially from the first buffer and the second buffer to an external memory, respectively,
wherein a first storage capacity of the first buffer is set larger than a second storage capacity of the second buffer as much as a prescribed storage capacity, and
wherein the prescribed storage capacity is capable of storing the first filtering result generated by the first deblocking filter during the delay of the operation timing of the second deblocking filter,
wherein the first deblocking filter, the second deblocking filter, and the data transfer unit perform pipeline operation,
wherein the first buffer and the second buffer of the data transfer unit hold the first filtering result and the second filtering result in parallel during one time slot of the pipeline operation,
wherein the first filtering result held in the first buffer and the second filtering result held in the second buffer are transferred sequentially to the external memory by the data transfer unit during another time slot next to the one time slot,
wherein the first deblocking filter and the first buffer of the data transfer unit perform the pipeline operation to process the macroblock sequential in a prescribed processing period, and the second deblocking filter and the second buffer of the data transfer unit perform the pipeline operation to process the macroblock sequentially in the prescribed processing period,
wherein, in another processing period after the prescribed processing period, the first filtering result of the first deblocking filter and the second filtering result of the second deblocking filter are transferred sequentially from the first buffer and the second buffer to the external memory, respectively,
wherein the first moving image processing unit further comprises a first variable length coding/decoding unit, a first frequency conversion unit, and a first motion compensation unit, and the second moving image processing unit further comprises a second variable length coding/decoding unit, a second frequency conversion unit, and a second motion compensation unit,
wherein the first variable length coding/decoding unit, the first frequency conversion unit, the first motion compensation unit, and the first deblocking filter, all of which the first moving image processing unit comprises, and the second variable length coding/decoding unit, the second frequency conversion unit, the second motion compensation unit, and the second deblocking filter, ail of which the second moving image processing unit comprises, perform the pipeline operation to process the macroblock sequentially during the prescribed processing period,
wherein the first deblocking filter and the second deblocking filter comprise internally a first memory and a second memory, respectively, and
wherein data of a macroblock as a processing target of filtering by the first deblocking filter is stored in the first memory for use in the next filtering of a macroblock as the next processing target, and data of a macroblock as a processing target of filtering by the second deblocking filter is stored in the second memory for use in the next filtering of a macroblock as the next processing target.

2. The moving image processor according to claim 1, further comprising:

another memory coupled to the first moving image processing unit and the second moving image processing unit, wherein data of an area at a bottom boundary of a macroblock arranged in the one line filtered by the first deblocking filter is stored in the another memory for use in intra frame prediction of a macroblock arranged in the next line, and wherein data of an area at a bottom boundary of a macroblock arranged in the next line filtered by the second deblocking filter is stored in the another memory for use in intra frame prediction of a macroblock arranged in a further next line of the next line.

3. The moving image processor according to claim 2, wherein the first moving image processing unit, the second moving image processing unit, and the data transfer unit are integrated over a semiconductor substrate of a semiconductor integrated circuit configuring the moving image processor.

4. The moving image processor according to claim 3, wherein the data transfer unit is a direct memory access controller.

5. The moving image processor according to claim 1, wherein the external memory is a synchronous dynamic random access memory capable of being coupled to the semiconductor integrated circuit.

* * * * *